United States Patent
Kimoto

(10) Patent No.: US 9,253,391 B2
(45) Date of Patent: Feb. 2, 2016

(54) IMAGE CAPTURE APPARATUS AND CONTROL METHOD FOR TRACKING OF FOCUS POSITION

(71) Applicant: CANON KABUSHIKI KAISHA, Tokyo (JP)

(72) Inventor: Satoshi Kimoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/964,642

(22) Filed: Aug. 12, 2013

(65) Prior Publication Data

US 2014/0049656 A1 Feb. 20, 2014

(30) Foreign Application Priority Data

Aug. 15, 2012 (JP) ................................ 2012-180205

(51) Int. Cl.
| | |
|---|---|
| G03B 13/00 | (2006.01) |
| H04N 5/232 | (2006.01) |
| G02B 7/36 | (2006.01) |
| G03B 7/28 | (2006.01) |
| G02B 7/38 | (2006.01) |
| H04N 5/228 | (2006.01) |

(52) U.S. Cl.
CPC ............. *H04N 5/23212* (2013.01); *G02B 7/36* (2013.01); *G02B 7/365* (2013.01); *G02B 7/38* (2013.01); *G03B 7/28* (2013.01); *H04N 5/23251* (2013.01)

(58) Field of Classification Search
USPC ...................... 348/353, 208.12, 349, 355–356
See application file for complete search history.

(56) References Cited

U.S. PATENT DOCUMENTS

| | | | | | |
|---|---|---|---|---|---|
| 5,218,442 | A | * | 6/1993 | Hamada et al. | 348/208.15 |
| 6,507,367 | B2 | * | 1/2003 | Yasuda | 348/355 |
| 6,721,013 | B1 | * | 4/2004 | Tsujino | 348/345 |
| 7,057,646 | B2 | * | 6/2006 | Yasuda | 348/208.99 |
| 7,397,510 | B2 | * | 7/2008 | Yasuda | 348/356 |
| 7,796,182 | B2 | * | 9/2010 | Konishi | 348/345 |
| 7,852,398 | B2 | * | 12/2010 | Yasuda | 348/345 |
| 7,860,387 | B2 | * | 12/2010 | Ishikawa | 396/124 |
| 8,525,916 | B2 | * | 9/2013 | Okamoto | H04N 5/23209 348/240.3 |
| 2009/0273703 | A1 | * | 11/2009 | Kawauchi | G02B 7/365 348/347 |
| 2012/0013786 | A1 | * | 1/2012 | Yasuda et al. | 348/349 |

FOREIGN PATENT DOCUMENTS

| | | |
|---|---|---|
| JP | 3054603 B | 6/2000 |
| JP | 4438047 B | 3/2010 |

* cited by examiner

*Primary Examiner* — Ngoc-Yen Vu
(74) *Attorney, Agent, or Firm* — Cowan, Liebowitz & Latman, P.C.

(57) ABSTRACT

Provided is an image capture apparatus that can perform focus detection based on a focus evaluation value indicating contrast of a subject image included in a focus detection area using an image signal output from an image sensor. In accordance with the extent of a blur amount of the subject image, the image capture apparatus determines how to use a method for performing focus detection through a reciprocating motion of a focus lens and a method for performing focus detection by moving the focus lens in a direction toward which the focus evaluation value increases. Focus detection is performed based on the determination.

16 Claims, 16 Drawing Sheets

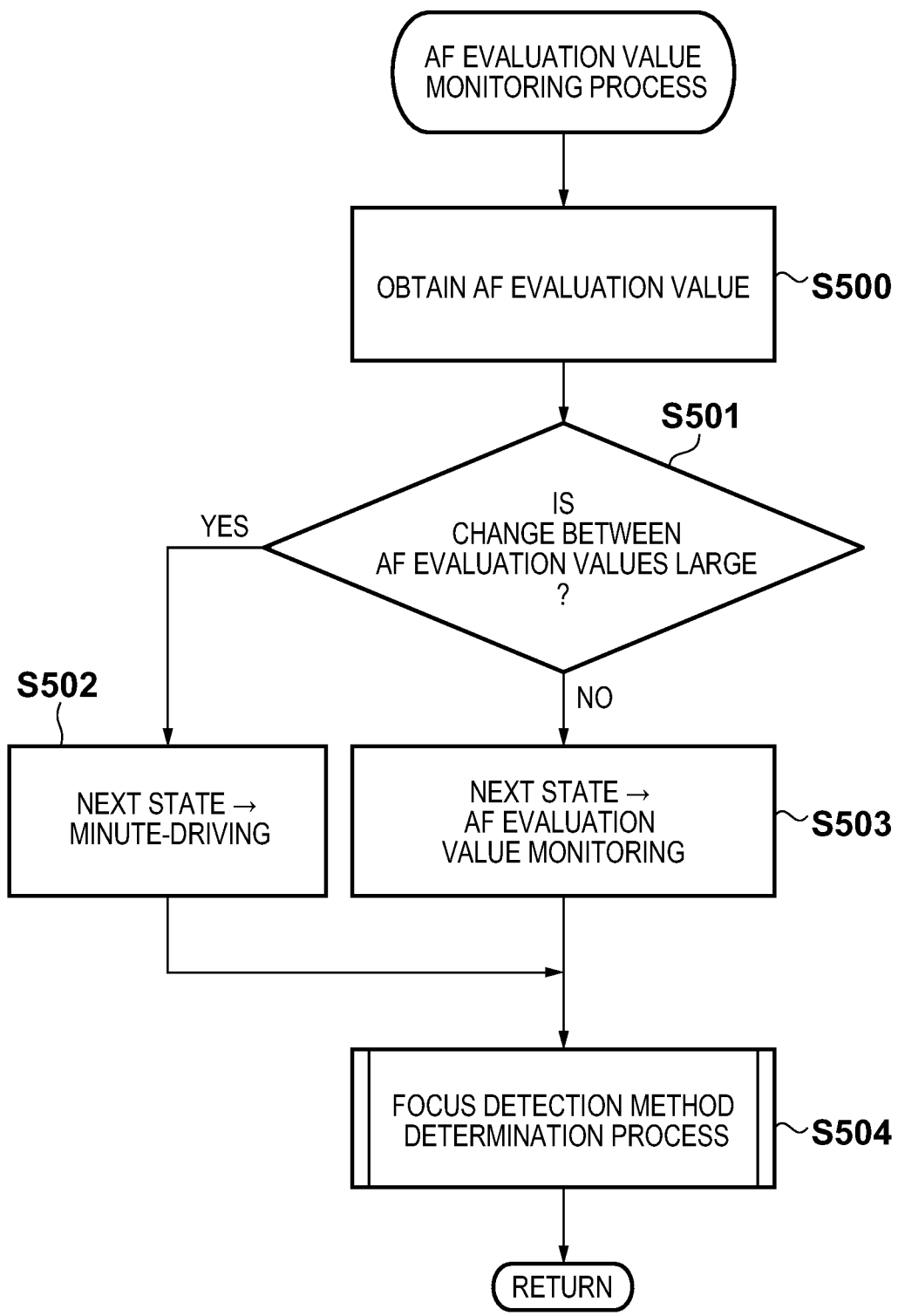

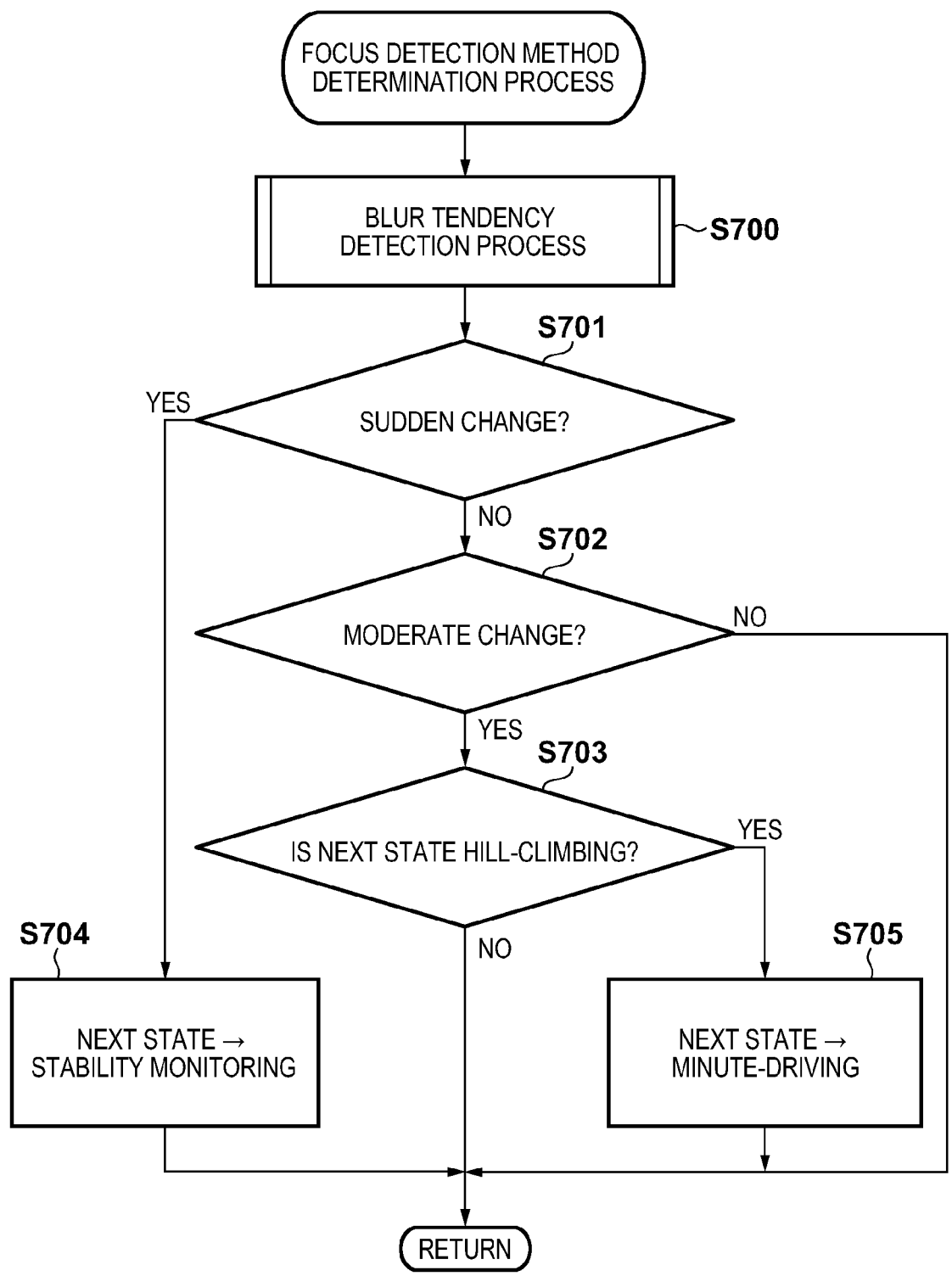

MODERATE CHANGE

SUDDEN CHANGE

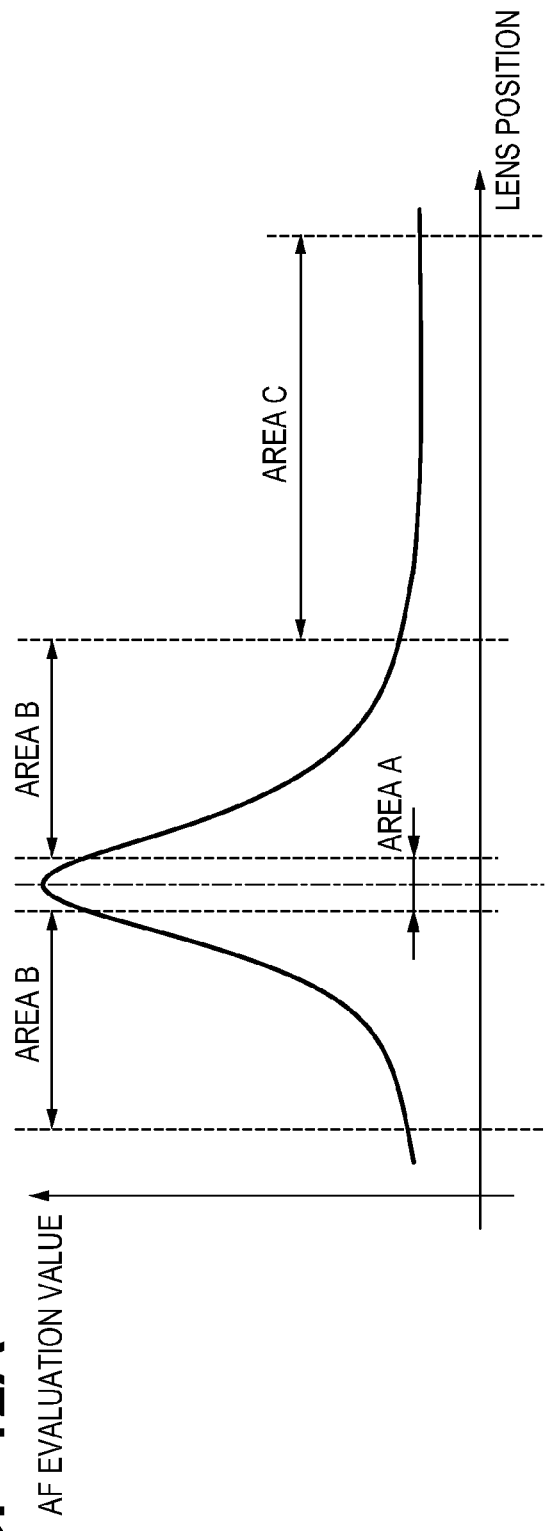
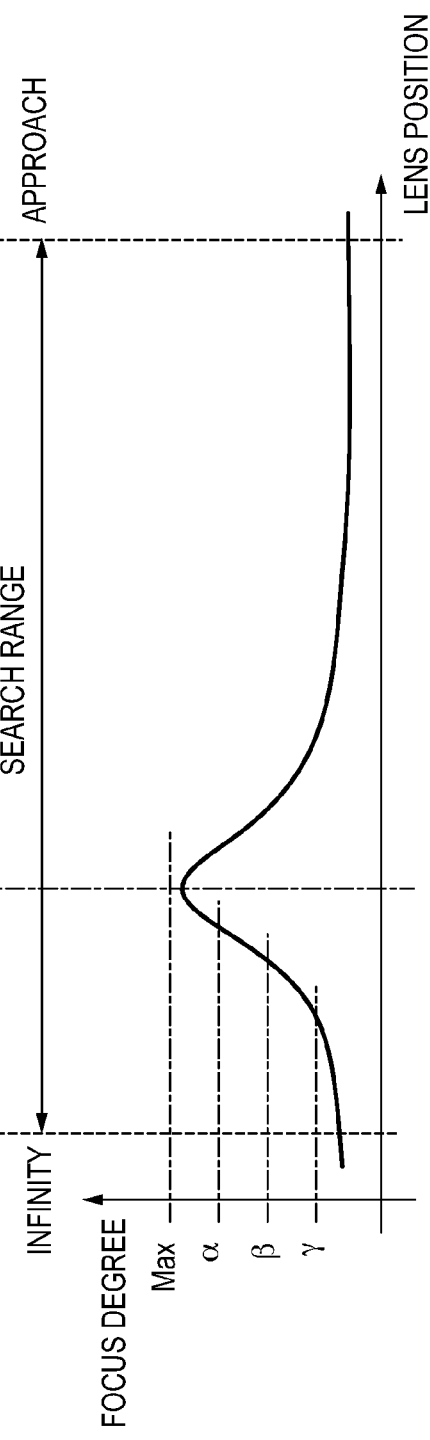
FIG. 12A
FIG. 12B

IMAGE CAPTURE APPARATUS AND CONTROL METHOD FOR TRACKING OF FOCUS POSITION

BACKGROUND OF THE INVENTION

1. Technical Field

This disclosure relates to an image capture apparatus and a control method therefor.

2. Description of the Related Art

Conventionally, image capture apparatuses such as digital video cameras and digital cameras often have so-called contrast-detection type autofocus (AF) as an AF function. Contrast-detection type AF uses the sharpness of a captured image as an AF evaluation value, and focuses on a subject by controlling the position of a focus lens so as to maximize the AF evaluation value. The sharpness of an image used as an AF evaluation value may be, for example, the level of high-frequency components extracted from image signals.

According to contrast-detection type AF, the AF evaluation value is computed based on a captured image and hence could change due to factors other than defocus. For example, in the case where captured images are not still images (captured images are moving images), e.g. when capturing images while panning and when a camera shake occurs, the spatial frequency distribution in the images decreases overall, resulting in a decrease in high-frequency components and the AF evaluation value.

The AF evaluation value is used not only in detection of a focus position, but also in determination of a focus direction and control of an AF operation. Therefore, the influence of a change in the AF evaluation value caused by image blur is versatile. For example, in the case of AF control that has a plurality of inner states and transits the inner state to another inner state in accordance with the AF evaluation value and a change therein, the influence of the change in the AF evaluation value caused by image blur varies with each inner state.

Examples of the inner states of AF control include a minute-driving operation (wobbling) and hill-climbing operation. The minute-driving operation is an operation for obtaining an AF evaluation value by intermittently causing the reciprocating driving of a focus lens within a minute range, and for detecting a direction in which the AF evaluation value increases as a direction of a focus position and identifying the focus position. The hill-climbing operation is an operation for obtaining an AF evaluation value at a plurality of positions while driving the focus lens in the focus direction detected through the minute-driving operation, and for identifying a focus position based on a change in the AF evaluation value.

When image blur has occurred, the minute-driving operation is executed first to identify the direction of the focus position and the focus position. In this case, however, as it is difficult to detect a change in the AF evaluation value compared to the case where the image is stable, it takes time to identify the focus position and the direction thereof. Accordingly, the minute-driving operation is transited to the hill-climbing operation to search for the focus position from a wide range. However, the hill-climbing operation is easily influenced by the change in the AF evaluation value caused by image blur as it identifies the focus position based on an increase and a decrease in the AF evaluation value. Therefore, there are cases where the identified focus position is different from an expected position and captured images are unpleasant to view because the operation of tracking the focus position is unstable.

Meanwhile, many of today's cameras have a camera shake correction function. A camera shake correction function optically or electronically corrects image blur by detecting the amount and direction of image blur based on the output from an angular velocity sensor, such as a vibrating structure gyroscope, and on correlation between images captured in chronological order. Japanese Patent No. 3054603 suggests that information of the detected image blur be used in AF control, or more specifically that AF be not performed while the amount of image blur is large. On the other hand, Japanese Patent No. 4438047 suggests that, in the minute-driving operation whereby AF is performed while operating the focus lens minutely and intermittently, AF be continued after changing a driving condition when the amount of image blur is larger than a predetermined amount.

However, according to the method described in Japanese Patent No. 3054603, while AF is not performed because the amount of image blur is large, tracking cannot be performed in accordance with a change in the distance to a subject.

On the other hand, according to Japanese Patent No. 4438047, although the minute-driving operation is continued under a driving condition that takes into consideration the influence of image blur, the influence of image blur is not taken into consideration in the hill-climbing operation. Therefore, when the operational state of AF is transited from the minute-driving operation to the hill-climbing operation during the occurrence of image blur, the result of AF performed in the hill-climbing operation may be erroneous or unstable due to the influence of image blur as described earlier.

SUMMARY OF THE INVENTION

Some embodiments provide an image capture apparatus and a control method therefor that realize stable tracking of a focus position even when an AF evaluation value does not show the expected changing tendency due to the influence of image blur.

According to one aspect of the present invention, there is provided an image capture apparatus comprising: an image sensor; a computation unit that computes a focus evaluation value indicating contrast of a subject image included in a focus detection area using an image signal output from the image sensor; a first focus detection unit that performs focus detection through a reciprocating motion of a focus lens; a second focus detection unit that performs focus detection by moving the focus lens in a direction toward which the focus evaluation value increases; and a blur detection unit that detects a blur amount of the subject image, wherein when the blur amount is larger than or equal to a first threshold, focus detection is performed using the first focus detection unit without using the second focus detection unit.

According to another aspect of the present invention, there is provided a control method for an image capture apparatus including an image sensor, the method comprising: a computation step of computing a focus evaluation value indicating contrast of a subject image included in a focus detection area using an image signal output from the image sensor; a blur detection step of detecting a blur amount of the subject image; and a focus detection step of performing focus detection by driving a focus lens, wherein the focus detection step can execute: a first focus detection method for performing focus detection through a reciprocating motion of the focus lens; and a second focus detection method for performing focus detection by moving the focus lens in a direction toward which the focus evaluation value increases, and when the blur amount is larger than or equal to a first threshold, the focus detection step performs focus detection using the first focus detection method without using the second focus detection method.

Further features of some embodiments will become apparent from the following description of exemplary embodiments with reference to the attached drawings.

BRIEF DESCRIPTION OF THE DRAWINGS

FIG. 5 is a flowchart of an AF evaluation value monitoring process of a digital camera according to an embodiment.

FIG. 7 is a flowchart of a focus detection method determination process of a digital camera according to an embodiment.

FIGS. 12A and 12B schematically show examples of a relationship between an AF evaluation value and a lens position.

DESCRIPTION OF THE EMBODIMENTS

Figure 1:
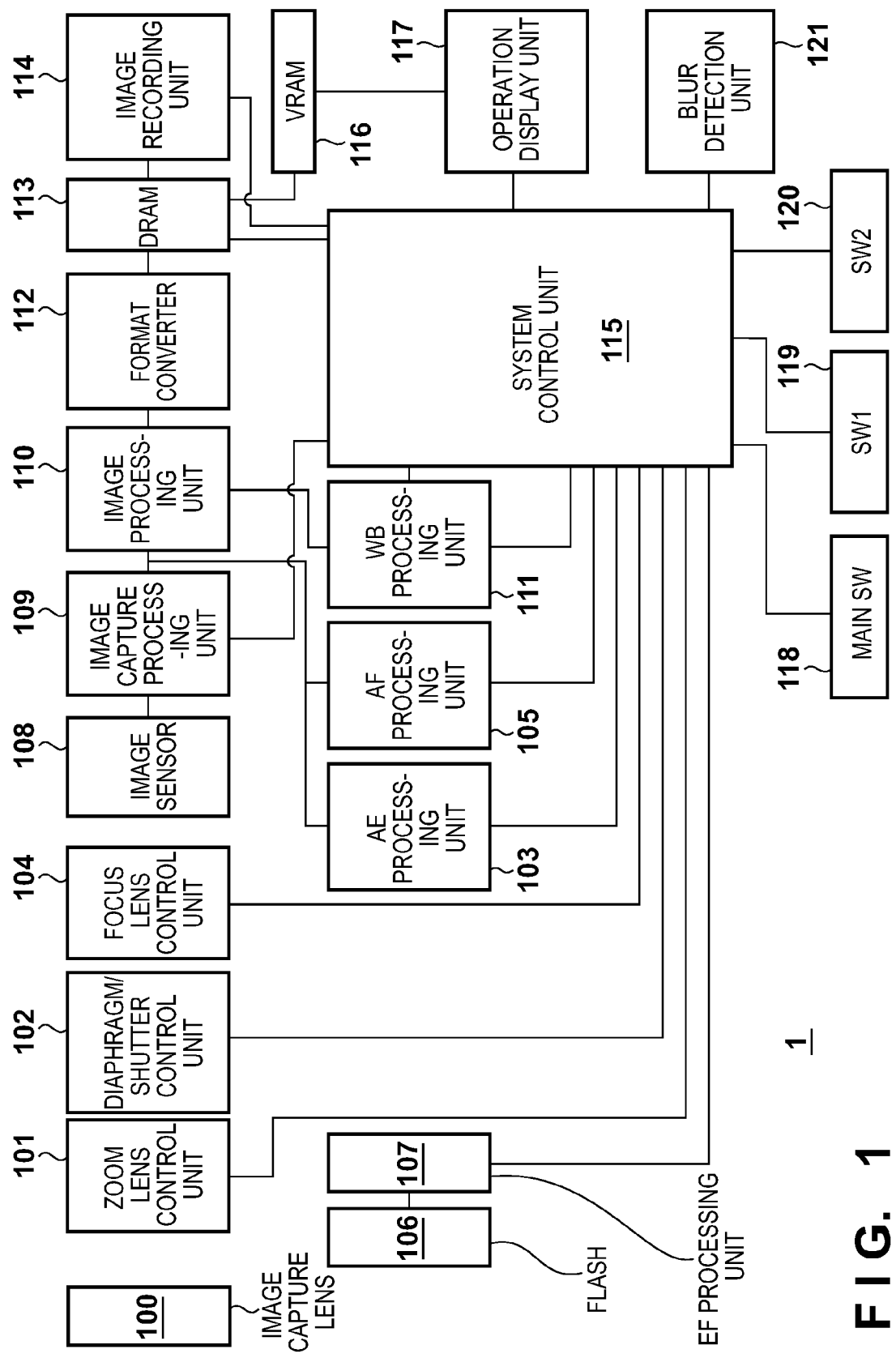
FIG. 1 is a block diagram showing an example of a functional configuration of a digital camera which is one example of an image capture apparatus according to an embodiment.

Exemplary embodiments will now be described in detail in accordance with the accompanying drawings.
First Embodiment
<Overall Configuration of Image Capture Apparatus>
FIG. 1 is a block diagram schematically showing an example of a functional configuration of a digital camera 1 which is one example of an image capture apparatus according to an embodiment. While an image capture lens is included in the configuration in FIG. 1, the image capture lens may be exchangeable and hence may not be included in the digital camera 1. Also, the image capture apparatus may be built in another electronic device such as a mobile telephone, mobile game console and personal computer.

A system control unit 115 includes, for example, a CPU, RAM and ROM, and controls the overall operations of the digital camera 1 according to the present embodiment in accordance with programs prestored in the ROM while using the RAM as a work area. Note that while the later-described processes are executed mainly by the system control unit 115 as software, at least a part of these processes may be executed using dedicated hardware. The system control unit 115 realizes an autofocus (AF) process by identifying a focus position based on focus evaluation values (AF evaluation values) computed by an AF processing unit 105 and moving a focus lens through control of a focus lens control unit 104. Focus evaluation values are numerical values that serve as indexes of contrast of an image included in a focus detection area.

An image capture lens 100 is a common zoom lens with which the angle of view and focus position can be controlled. A zoom lens control unit 101 controls the driving of a varifocal lens that changes the focal length (angle of view) of the image capture lens 100. A diaphragm/shutter control unit 102 controls the driving of a diaphragm, which controls the amount of light, and a shutter. In the present embodiment, a shutter that has a function of a diaphragm is provided in the image capture lens 100. The focus lens control unit 104 controls the driving of the focus lens so as to cause the image capture lens 100 to focus on an image sensor 108. Note that in the present embodiment, the zoom lens control unit 101, the diaphragm/shutter control unit 102 and the focus lens control unit 104 have optical elements such as lenses, mechanisms of a diaphragm and shutter, and various types of devices necessary for driving them. These various types of devices include, for example, an actuator for driving the optical elements and mechanisms, a circuit that controls the actuator, and a digital-to-analog converter. Note that in the case where the image capture lens 100 is exchangeable, the optical elements and driving mechanisms are provided in the image capture lens 100.

A flash (light emitting device) 106 adjusts the luminance of a subject by emitting light toward the outside. Upon receiving a "flash on" signal from the system control unit 115, an EF processing unit 107 controls the flash 106 to emit light. The system control unit 115 transmits the "flash on" signal to the EF processing unit 107 when it determines that it is necessary to cause the flash 106 to emit light.

The image sensor 108 is composed of, for example, a photoelectric conversion element such as a CCD or CMOS imager, and outputs image capture signals obtained by converting a focused subject image into electrical signals in units of pixels. An image capture processing unit 109 includes a CDS circuit, a non-linear amplification circuit and an analog-to-digital converter. The CDS circuit removes noise output from the image sensor 108 from image capture signals using a correlated double sampling method. The non-linear amplification circuit applies signal amplification (gain control) to the image capture signals from which the noise has been removed by the CDS circuit. The analog-to-digital converter converts the image capture signals, which are analog signals, into digital signals. The image sensor 108 and image capture processing unit 109 function as an image capture unit that generates image capture signals corresponding to the subject image.

An image processing unit 110 applies predetermined image processes, such as gamma correction and edge correction, to the image capture signals (image data) that have been converted into digital signals. The image processing unit 110 also adjusts the white balance of the image capture signals based on control of a WB processing unit 111. A format converter 112 converts the supplied image capture signals into a format that is suitable for recording in a recording medium via an image recording unit 114 (described later) and for display via an operation display unit 117 (described later). A DRAM 113 is a high-speed built-in memory. The DRAM 113 is used as a buffer for temporarily storing the image capture signals, and as a work memory for compression and decompression processes for the image capture signals. The image recording unit 114 records the image capture signals that have been converted into a predetermined file format in a recording medium such as a memory card.

An automatic exposure (AE) processing unit 103 computes a photometric value corresponding to the brightness of the subject based on the image capture signals obtained from the image capture unit (image sensor 108 and image capture processing unit 109). The AE processing unit 103 also determines the amount of signal amplification (amount of gain) by which the image capture signals are amplified to maintain the correct exposure when, for example, the luminance of the subject is low. In other words, the AE processing unit 103 determines the amount of signal amplification (amount of gain) for correcting the image capture signals to realize the correct exposure. Based on the photometric value computed by the AE processing unit 103 and on a prestored program diagram, the system control unit 115 determines exposure conditions such as a diaphragm value, shutter speed and film speed, and controls the diaphragm/shutter control unit 102 and the non-linear amplification circuit in the image capture processing unit 109. The system control unit 115 executes an AE process in the above manner.

Figure 11:
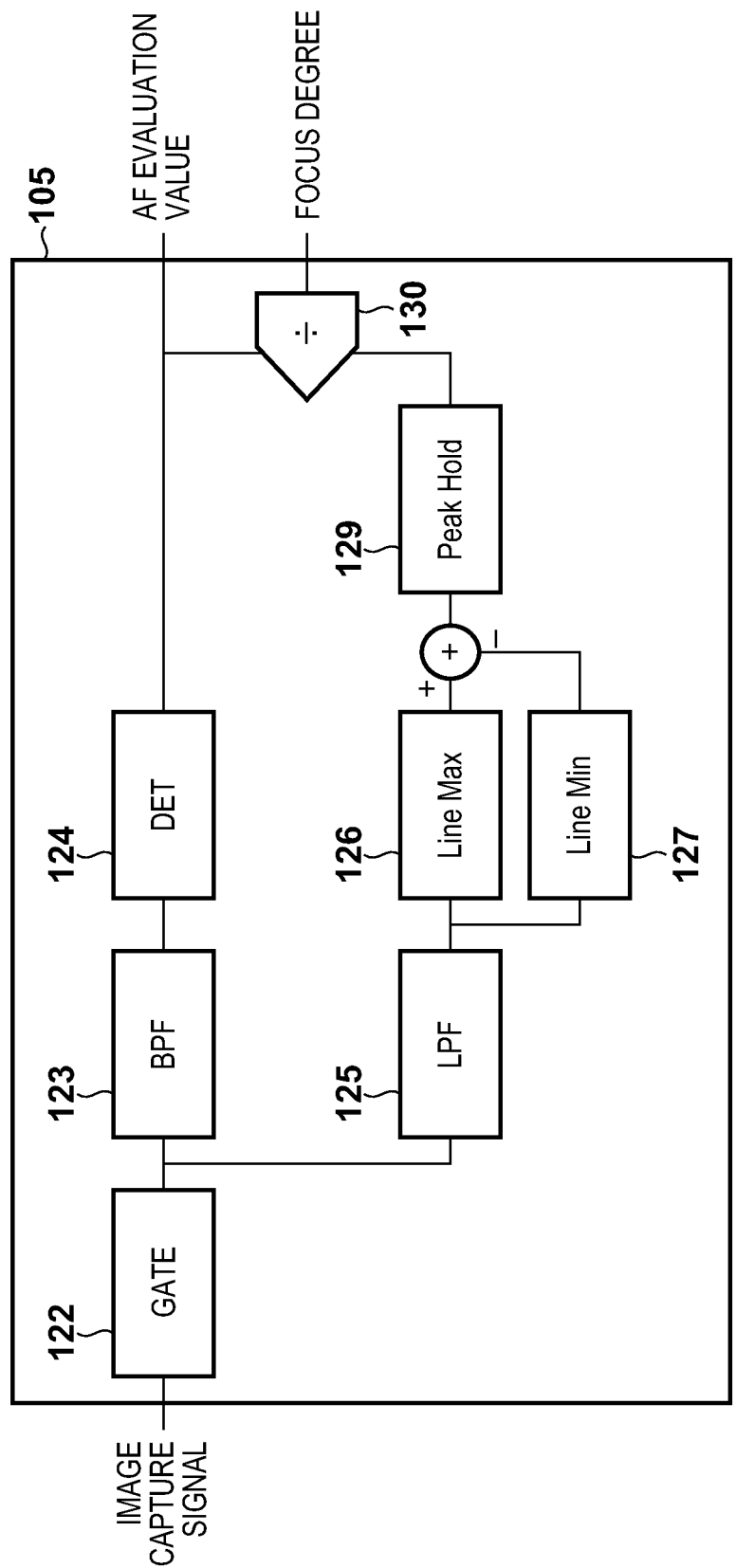
FIG. 11 is a block diagram showing an example of a configuration of an AF processing unit in a digital camera according to an embodiment.

Based on the AF evaluation values obtained from the AF processing unit 105, the system control unit 115 executes an AF process by controlling the focus lens control unit 104. FIG. 11 shows an example of a configuration of the AF processing unit 105. A gate 122 extracts, from the image capture signals obtained from the image capture processing unit 109, image capture signals corresponding to a predetermined focus detection area. A band-pass filter (BPF) 123 extracts, from the image capture signals extracted by the gate 122, only high-frequency components as components of predetermined frequencies. A detection (wave detection) unit (DET) 124 executes processes such as peak hold and integration. Note that in the present embodiment, the output obtained by applying an integration process to the high-frequency components of the image capture signals is used as an AF evaluation value.

The AF processing unit 105 further computes a focus degree indicating a focus detection state (the extent of focus on the image capture signals in the focus detection area). A low-pass filter (LPF) 125 removes high-frequency components of the image capture signals extracted by the gate 122. A line maximum value unit (Line Max) 126 and a line minimum value unit (Line Min) 127 detect the maximum value and the minimum value of one horizontal line, respectively. An addition unit 128 computes a difference between the maximum and minimum values of one horizontal line (the maximum value—the minimum value). A peak hold unit 129 detects a peak value MM of values obtained by applying the expression "the maximum value—the minimum value" to all horizontal lines included in the image area extracted by the gate 122. The peak value MM is equivalent to the maximum value of contrast in the image area extracted by the gate 122.

A division unit 130 computes a focus degree by dividing a peak hold value of the band-pass filter 123 detected by the detection unit 124 by the peak value MM. Note that in the case where the output obtained by integrating the high-frequency components is used as an AF evaluation value, while the influence of noise and the like can be suppressed by the integration, the extent of the AF evaluation value at a focus position varies to a large degree depending on the type of the subject and image capture conditions (e.g. the luminance of the subject, illuminance, and focal length) (FIG. 12A). On the other hand, a normalized focus degree shows a tendency to approach a certain value (Max in FIG. 12B) at a focus position, and to decrease as defocus progresses (FIG. 12B). In the present embodiment, an autofocus process is executed using the characteristics of AF evaluation values and a focus degree.

Returning to FIG. 1, a VRAM 116 is a memory for displaying images and can store image capture signals and the like. The operation display unit 117 can display images, information for assisting operations, and a camera state. The operation display unit 117 can also perform live-view display during image capture. A main switch (main SW) 118 is a switch for turning ON/OFF the power of the digital camera 1. A first switch (SW1) 119 is a switch for instructing the start of a standby operation for image capture (a warm-up operation for image capture), such as AF and AE. A second switch (SW2) 120 is a switch for instructing the start of image capture. In order for the second switch 120 to turn on, the first switch 119 needs to be on. In general, the first switch 119 is configured to turn on when a release button is pressed halfway down, and the second switch 120 is configured to turn on when the release button is pressed all the way down.

A blur detection unit 121 is an angular velocity sensor such as a vibrating structure gyroscope. The system control unit 115 detects a blur amount of the subject image (image blur amount) based on the output from the angular velocity sensor. While the blur amount is detected based on the output from the angular velocity sensor in the present embodiment, the blur amount of the subject image may be detected based on a motion vector between images without using the angular velocity sensor.

<Basic Operations>

Figure 2A:
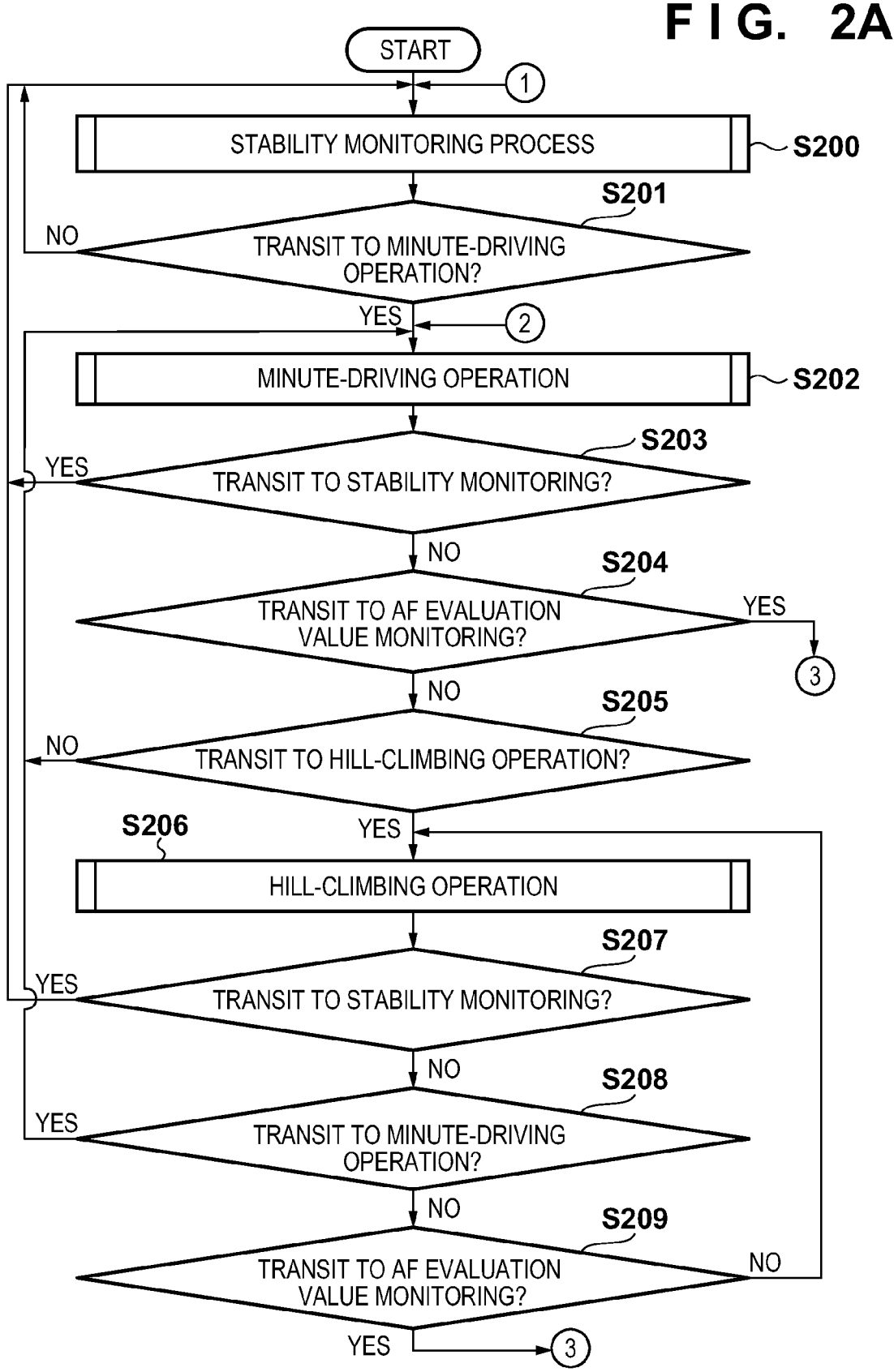
FIGS. 2A and 2B are flowcharts of a focus detection operations of a digital camera according to an embodiment.
Figure 2B:
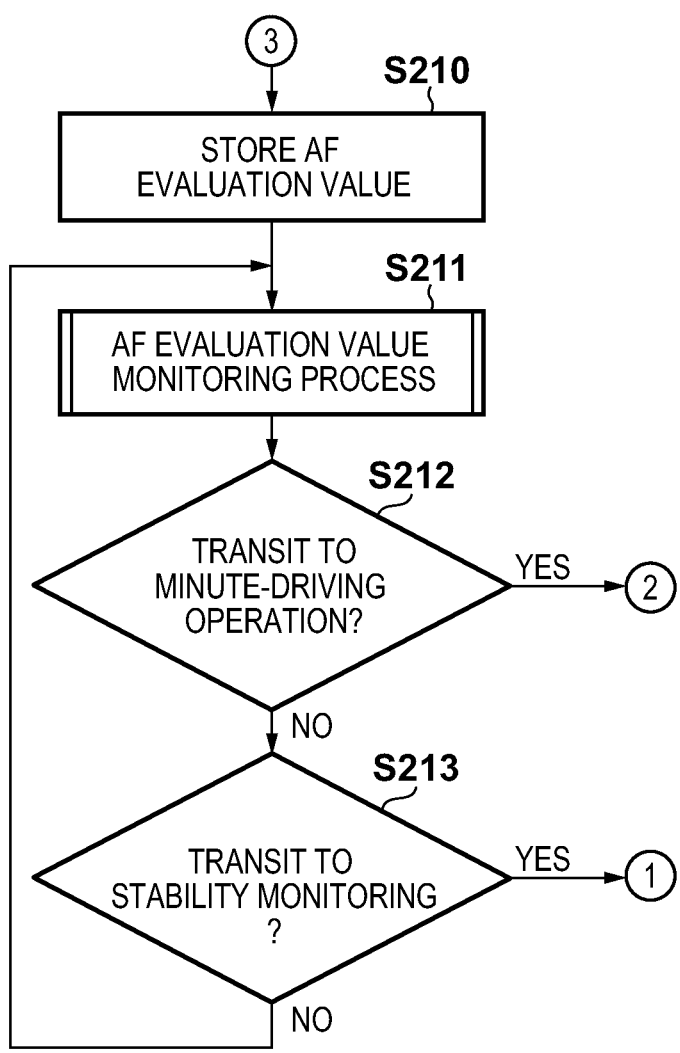

The following describes an overall flow of a focus detection operation of the digital camera 1 according to the present embodiment with reference to flowcharts of FIGS. 2A and 2B.

Note that in the present embodiment, the focus detection operation is continuously executed during video recording and standby. Also note that the flowcharts according to the present embodiment are held in the ROM of the system control unit 115 as computer programs (software). These flowcharts are executed mainly by the system control unit 115 after the digital camera 1 according to embodiments is activated following the power-on caused by an operation on the main switch 118.

First, in S200, the system control unit 115 executes a stability monitoring process. In this stability monitoring process, the system control unit 115 determines a blur state that occurs when a camera operator operates the digital camera 1 due to a camera shake, panning, and the like. When the system control unit 115 determines the occurrence of a blur state in which the focus detection operation cannot be executed appropriately, it stops the focus detection operation and continues monitoring of a blur state until it determines the occurrence of a blur state in which the digital camera 1 is stable and an appropriate focus detection operation can be executed (stable state). Specifics of the stability monitoring process will be described later.

Next, in S201, the system control unit 115 determines whether or not the next operational state to transit to is the minute-driving operation as a result of the stability monitoring process in S200. When the system control unit 115 determines in S201 that the next operational state to transit to is the minute-driving operation, it proceeds to the process of S202. On the other hand, when the system control unit 115 determines that the next operational state to transit to is not the minute-driving operation, it returns to the process of S200 and continues monitoring of a blur state until it determines the occurrence of the stable state.

In S202, the system control unit 115 executes the minute-driving operation (wobbling). The minute-driving operation, which is one of the inner states of AF control, is an operation for obtaining AF evaluation values while minutely and intermittently moving the focus lens, and for identifying the direction of a focus position and the focus position based on a change in the AF evaluation values. Specifics of the minute-driving operation will be described later.

In S203, S204 and S205, the system control unit 115 determines the next inner state to transit to based on the result of the minute-driving operation in S202.

More specifically, the system control unit 115 determines whether or not to transit to the above-described stability monitoring process in S203, whether or not to transit to the later-described AF evaluation value monitoring process in S204, and whether or not to transit to the later-described hill-climbing operation in S205.

When the system control unit 115 determines to transit to the stability monitoring process in S203, it returns to the process of S200. When the system control unit 115 determines to transit to the AF evaluation value monitoring process in S204, it stores, in S210, an AF evaluation value at the focus position identified through the minute-driving operation in S202, or an AF evaluation value at a lens position at the time of stopping the minute-driving operation due to defocus. These pieces of information are used in the later-described AF evaluation value monitoring process. When the system control unit 115 determines to transit to the hill-climbing operation in S205, it executes the hill-climbing operation in S206. When the system control unit 115 does not determine to transit to the hill-climbing operation in S205, it returns to the process of S202 and continues the minute-driving operation.

The hill-climbing operation executed in S206, which is one of the inner states of AF control, is an operation for obtaining AF evaluation values while moving the focus lens continuously (or in a predetermined stepwise manner), and for identifying a focus position based on a change in the obtained plurality of AF evaluation values. Specifics of the hill-climbing operation will be described later.

In S207, S208 and S209, the system control unit 115 determines the next inner state to transit to based on the result of the hill-climbing operation in S206.

More specifically, the system control unit 115 determines whether or not to transit to the above-described stability monitoring process in S207, whether or not to transit to the above-described minute-driving operation in S208, and whether or not to transit to the AF evaluation value monitoring process in S209.

When the system control unit 115 determines to transit to the stability monitoring process in S207, it returns to the process of S200. When the system control unit 115 determines to transit to the minute-driving operation in S208, it returns to the process of S202. When the system control unit 115 determines to transit to the AF evaluation value monitoring process in S209, it proceeds to the process of S210 and stores an AF evaluation value at a lens position at the time of stopping the operation due to defocus in S206, so as to use the stored AF evaluation value in the later-described AF evaluation value monitoring process. On the other hand, when the system control unit 115 does not determine to transit to the AF evaluation value monitoring process in S209, it returns to the process of S206 and continues the hill-climbing operation.

A description is now given of the AF evaluation value monitoring process in S211. The AF evaluation value monitoring process is a process for monitoring a change in AF evaluation values by comparing a prestored AF evaluation value with the latest AF evaluation value. Specifics thereof will be described later.

In S212 and S213, the system control unit 115 determines the next inner state to transit to based on the result of the AF evaluation value monitoring process in S211. When the system control unit 115 determines to transit to the minute-driving operation in S212, the system control unit 115 returns to the process of S202. When the system control unit 115 determines to transit to the stability monitoring process in S213, it returns to the process of S200. On the other hand, when the system control unit 115 does not determine to transit to the stability monitoring process in S213, it returns to the process of S211 and continues the AF evaluation value monitoring process.

As described above, the system control unit 115 controls the focus lens so as to maintain the focus state in accordance with changes in various scenes by transiting between different inner states of AF control, namely between the minute-driving operation and the hill-climbing operation, while intermittently executing the AF evaluation value monitoring process and the stability monitoring process.

<Minute-Driving Operation>

Figure 3A:
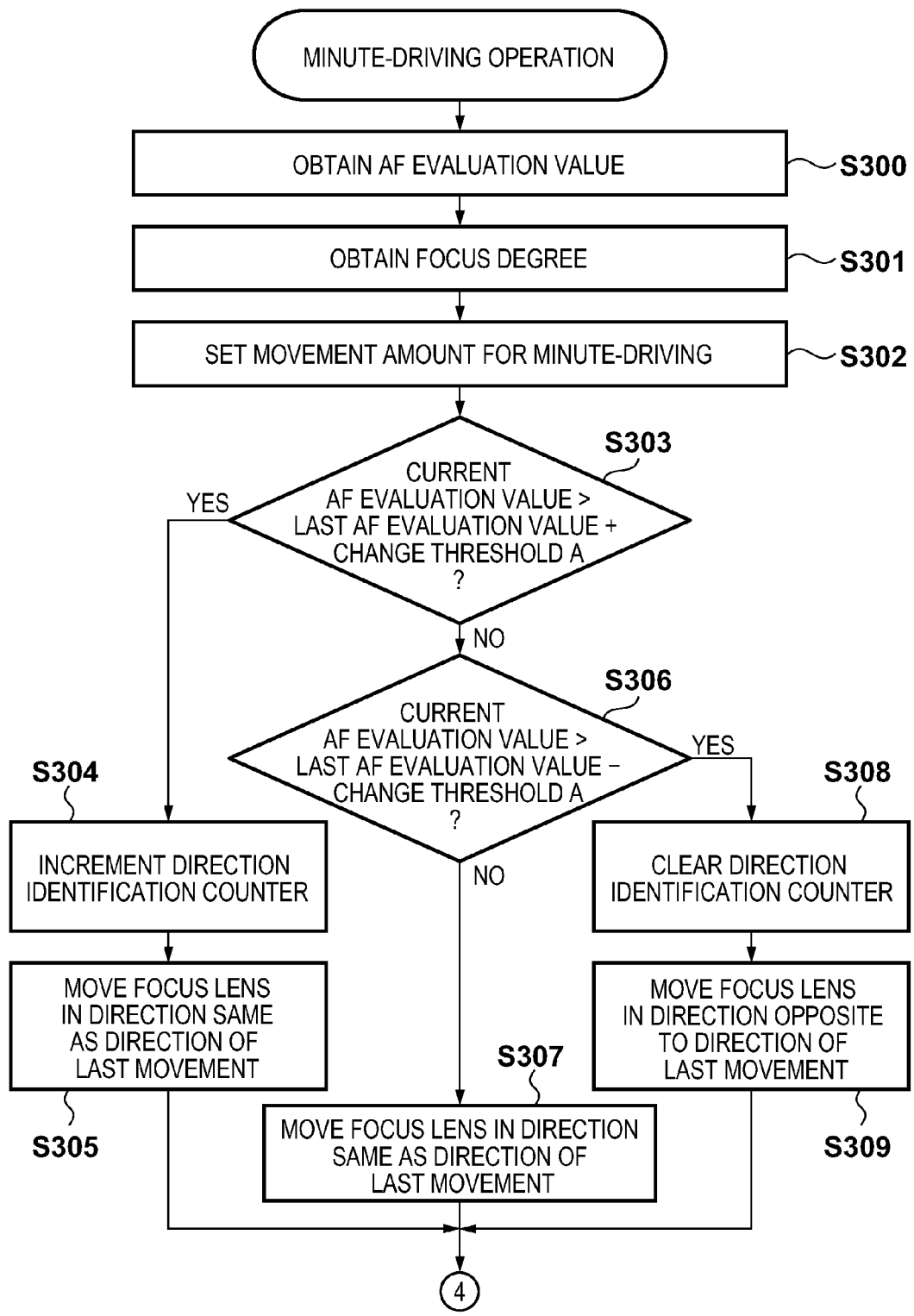
FIGS. 3A and 3B are flowcharts of a minute-driving operation of a digital camera according to an embodiment.
Figure 3B:
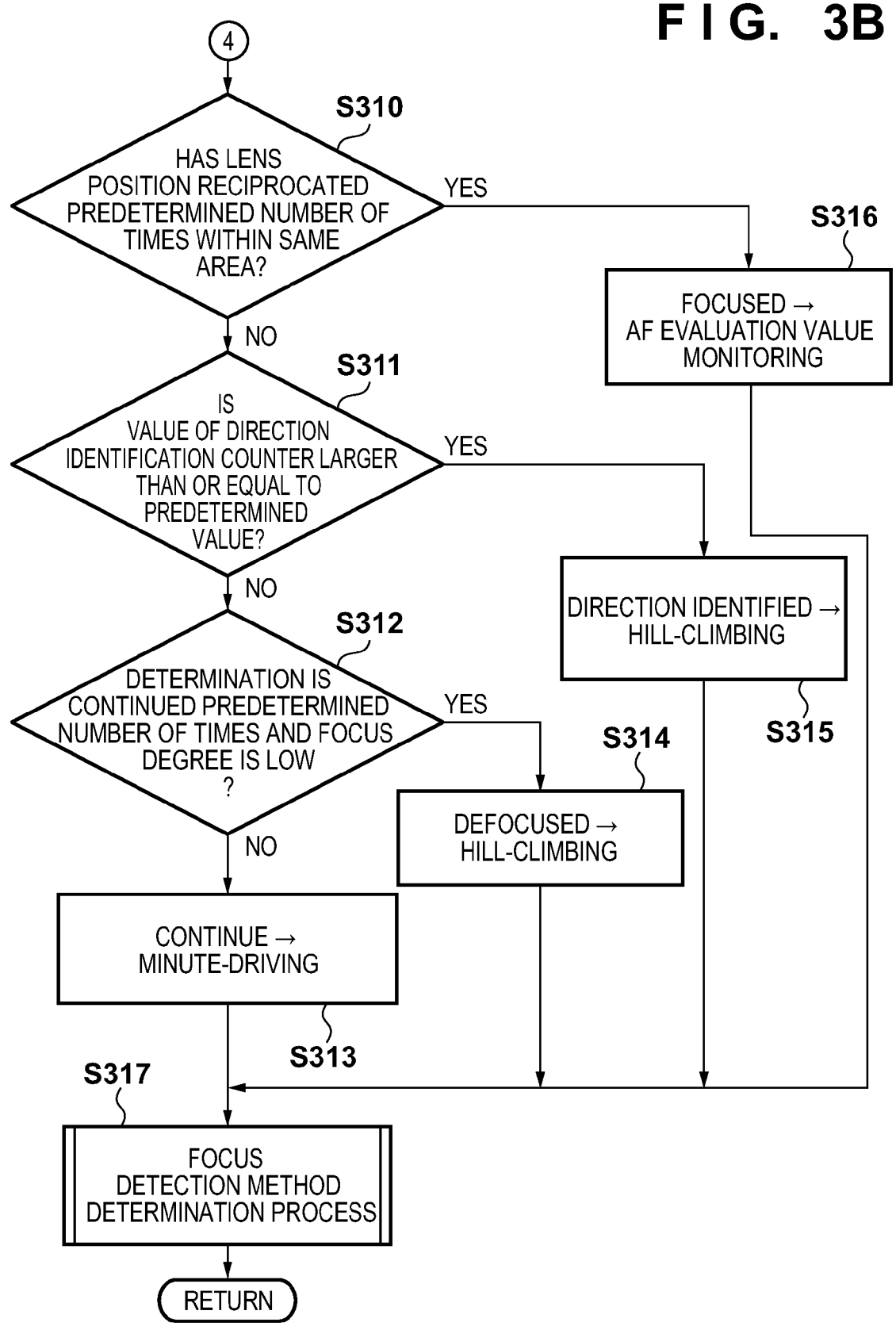

The following describes the minute-driving operation executed in S202 with reference to flowcharts of FIGS. 3A and 3B.

The minute-driving operation is a focus detection operation for minutely and intermittently moving the focus lens, and for identifying the direction of a focus position and the focus position based on a change in the obtained AF evaluation values. The minute-driving operation is executed by the system control unit 115.

First, the system control unit 115 obtains an AF evaluation value and a focus degree from the AF processing unit 105 in S300 and S301, respectively. Next, in S302, the system control unit 115 determines a movement amount of the focus lens in the minute-driving operation. Here, the movement amount of the focus lens is determined in accordance with the focus degree obtained in S301, so that it is smaller as the focus lens is closer to the focus position, and larger as the focus lens is farther from the focus position. In this way, stable focus tracking can be realized in the minute-driving operation.

For example, provided that a plurality of thresholds $\alpha$, $\beta$ and $\gamma$ are set for a focus degree so as to satisfy the relationship $\alpha > \beta > \gamma$ as shown in FIG. 12B, the movement amount can be determined as follows.

When the current focus degree>$\alpha$, the movement amount is Step 1.

When $\alpha \geq$ the current focus degree>$\beta$, the movement amount is Step 2.

When $\beta \geq$ the current focus degree>$\gamma$, the movement amount is Step 3.

When $\gamma \geq$ the current focus degree, the movement amount is Step 4.

(Here, Step 1<Step 2<Step 3<Step 4.)

Next, in S303, the system control unit 115 determines whether or not the current AF evaluation value is larger than (the immediately previous AF evaluation value+a change threshold A). Note that the change threshold A is used to determine that the AF evaluation value has clearly increased, and is set in consideration of the actual amount of increase in the AF evaluation value as well as variation attributed to noise components.

When the current AF evaluation value is smaller than or equal to (the immediately previous AF evaluation value+the change threshold A), the system control unit 115 proceeds to the process of S306. On the other hand, when the current AF evaluation value is larger than (the immediately previous AF evaluation value+the change threshold A) and therefore the increasing tendency of the AF evaluation values has been detected, the system control unit 115 proceeds to the process of S304 and increments a direction identification counter. The direction identification counter is used in identifying the direction of the focus position. The larger the value of the direction identification counter is, the more the AF evaluation values are increasing stably toward the focus position. In S305, the system control unit 115 moves the focus lens from the current position by the movement amount determined in S302. At this time, the moving direction is the same as the direction of the immediately previous movement.

In S306, the system control unit 115 determines whether or not the current AF evaluation value is larger than (the immediately previous AF evaluation value—the change threshold A). Contrary to S303, this determination is for detecting the decreasing tendency of the AF evaluation values.

When the current AF evaluation value is larger than (the immediately previous AF evaluation value—the change threshold A), the system control unit 115 proceeds to the process of S308 and clears the direction identification counter. Then, in S309, the system control unit 115 moves the focus lens from the current position by the movement amount determined in the S302 in a moving direction opposite to the direction of the immediately previous movement.

When the current AF evaluation value is smaller than or equal to (the immediately previous AF evaluation value—the change threshold A) in S306, the system control unit 115 proceeds to the process of S307 and moves the focus lens from the current position by the movement amount determined in S302 in the same moving direction as the direction of the immediately previous movement. In this case, a clear increase or decrease in the AF evaluation values cannot be detected, and therefore the direction identification counter is not operated.

Thereafter, in S310, the system control unit 115 determines whether or not the lens position has reciprocated a predetermined number of times within the same range. For example, when the lens position has entered the vicinity of the focus position as in an area A shown in FIG. 12A, if the lens position moves past the focus position through the minute-driving operation, then the AF evaluation values decrease and the moving direction is reversed at the next control timing. Thereafter, if the lens position moves past the focus position, then the moving direction is reversed again. In this way, when the position of the focus lens is in the vicinity of the focus position, the focus lens ultimately begins a reciprocating motion within a predetermined range that encompasses the focus position. Therefore, when the focus lens has reciprocated a predetermined number of times within the same range, the system control unit 115 determines that the focus lens is "focused" and transits from the minute-driving operation to the AF evaluation value monitoring process in S316.

On the other hand, when the system control unit 115 determines that the focus lens has not reciprocated a predetermined number of times within the same range, if the value of the direction identification counter is larger than or equal to a predetermined value in S311, then the system control unit 115 determines that "the direction has been identified" and transits from the minute-driving operation to the hill-climbing operation in S315. On the other hand, if the value of the direction identification counter is determined to be smaller than the predetermined value in S311, then the system control unit 115 determines in S312 whether or not the following conditions are both satisfied: a sequence of minute-driving operations has been executed a predetermined number of times; and the focus degree obtained in S301 is smaller than a predetermined threshold.

These conditions are satisfied when, for example, there is little change in the AF evaluation values relative to a change in the position of the focus lens as in an area C shown in FIG. 12A, and therefore the focus position and the direction thereof cannot be identified even after executing the minute-driving operation a predetermined number of times. More specifically, these conditions are satisfied when the focus position and the direction thereof cannot be identified by executing the minute-driving operation a predetermined number of times because a search range (a range within which the focus lens is moved) is wide and the current position is too far from the focus position, and when the focus position is outside the search range. In these cases, it is difficult to identify the focus position or the direction thereof by further continuing the minute-driving operation, and therefore the system control unit 115 proceeds to the process of S314, determines that the focus lens is "defocused," and sets the hill-climbing operation as the next state.

On the other hand, when a sequence of minute-driving operations has not been executed a predetermined number of times or when the focus degree obtained in S301 is larger than or equal to a predetermined threshold, the system control unit 115 proceeds to the process of S313 and determines to continuously execute the minute-driving operation without transiting to another state.

As described above, in the processes of S310 to S316, a change in the AF evaluation values that are obtained on a periodic basis is detected, and based on the detected change, a determination is made as to whether to continue the minute-driving operation or transit to a state for executing another process. Based on the result of this determination, the system control unit 115 executes a focus detection method determination process in S317.

This concludes the description of the minute-driving operation of the digital camera 1 according to an embodiment.

<Hill-Climbing Operation>

Figure 4A:
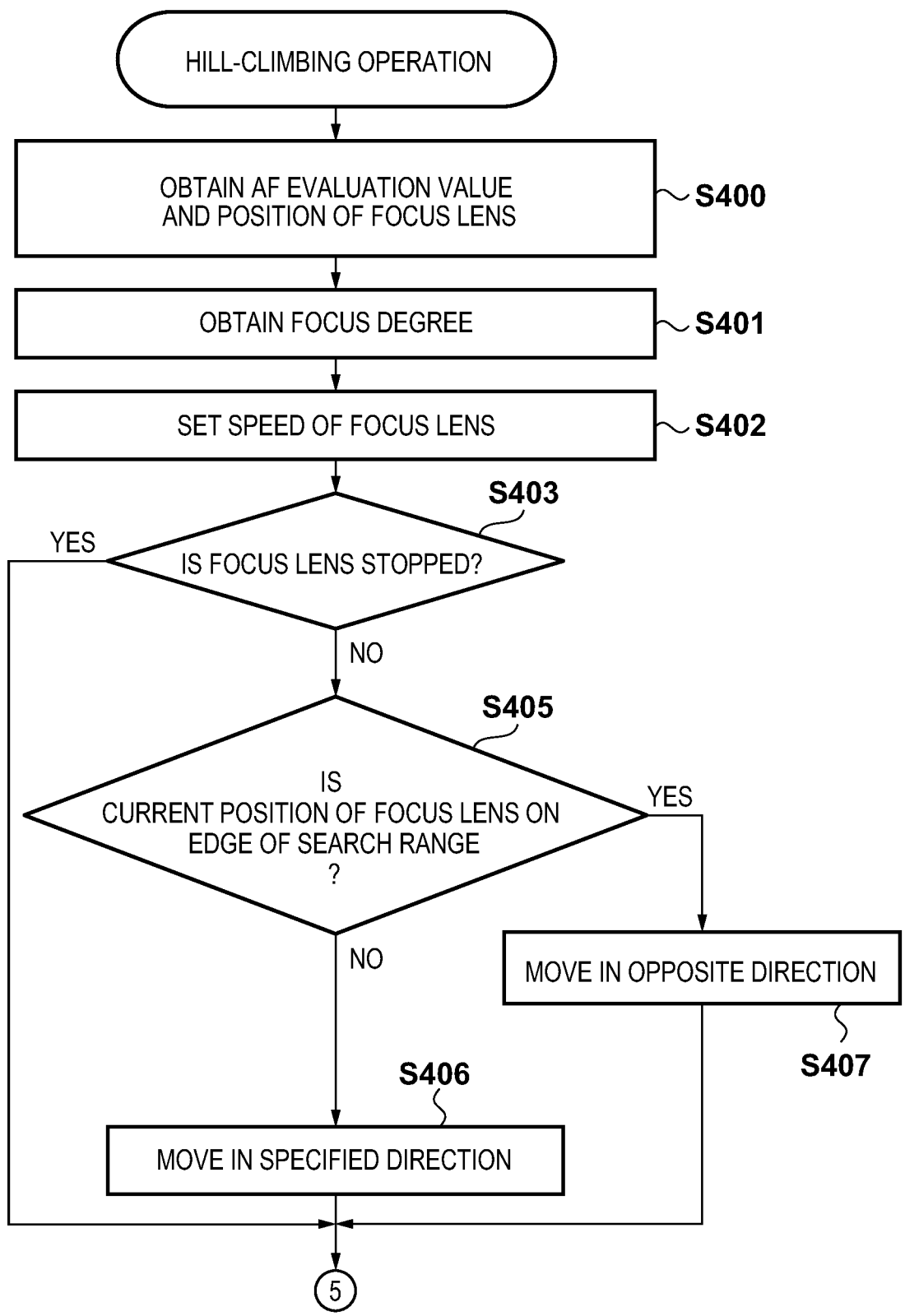
FIGS. 4A and 4B are flowcharts of a hill-climbing operation of a digital camera according to an embodiment.
Figure 4B:
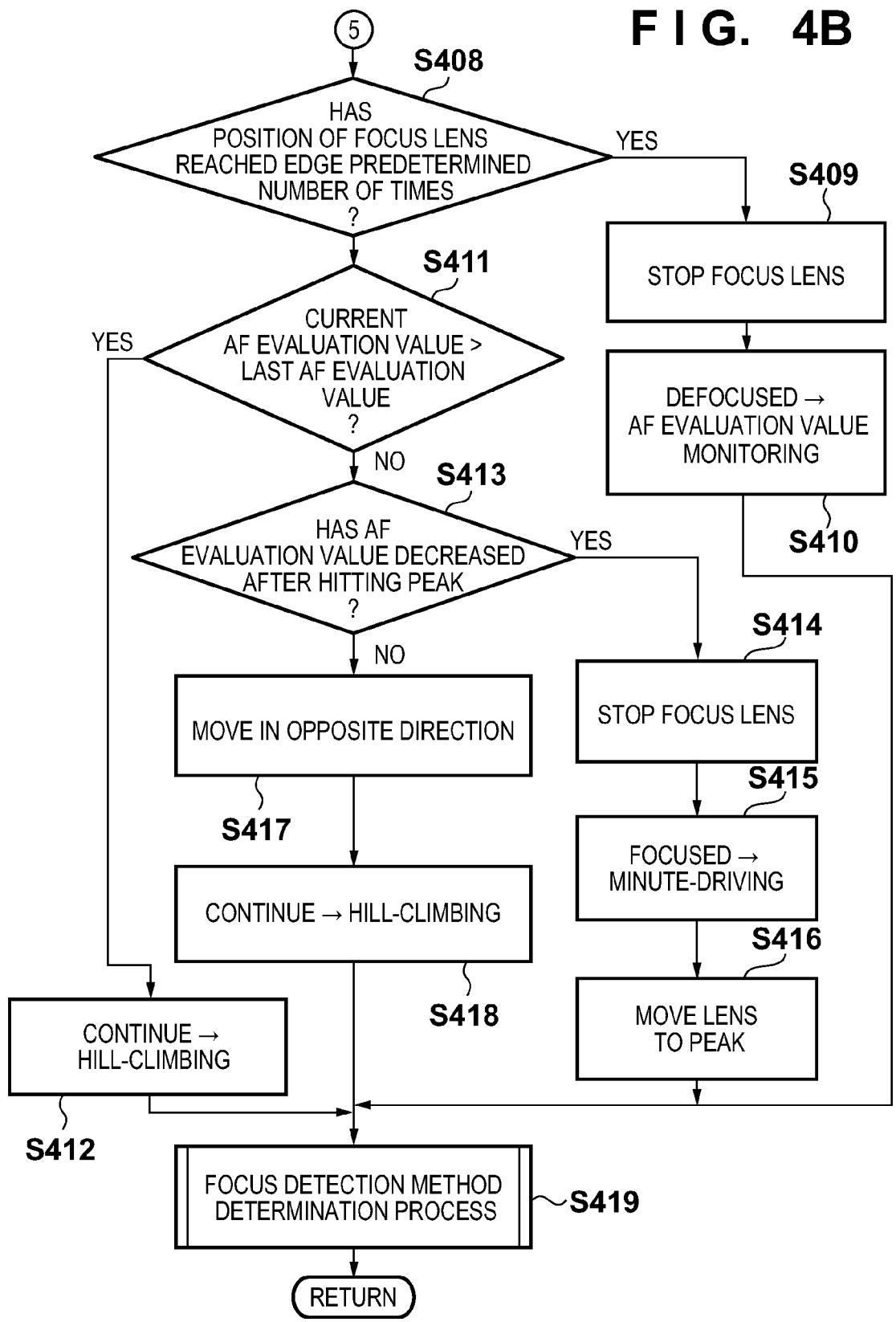

The following describes the hill-climbing operation executed in S206 with reference to flowcharts of FIGS. 4A and 4B.

The hill-climbing operation is a focus detection operation for obtaining AF evaluation values in sequence while continuously moving the focus lens within a range wider than the range of the minute-driving operation, and for identifying a focus position based on a change in the obtained plurality of AF evaluation values. The hill-climbing operation is executed by the system control unit 115.

The system control unit 115 obtains, from the AF processing unit 105, an AF evaluation value and a corresponding position of the focus lens in S400 and a focus degree in S401. Next, in S402, the system control unit 115 determines the moving speed of the focus lens in the hill-climbing operation. Here, the system control unit 115 determines the moving speed of the focus lens in accordance with the focus degree obtained in S401, so that it is slower as the focus lens is closer to the focus position, and faster as the focus lens is farther from the focus position. In this way, stable focus tracking can be realized in the minute-driving operation.

For example, provided that a plurality of thresholds $\alpha$, $\beta$ and $\gamma$ are set for a focus degree so as to satisfy the relationship $\alpha > \beta > \gamma$ as shown in FIG. 12B, the moving speed can be determined as follows.

When the current focus degree$>\alpha$, the moving speed of the lens is Speed 1.

When $\alpha \geq$ the current focus degree$>\beta$, the moving speed of the lens is Speed 2.

When $\beta \geq$ the current focus degree$>\gamma$, the moving speed of the lens is Speed 3.

When $\gamma \geq$ the current focus degree, the moving speed of the lens is Speed 4.

(Here, Speed 1<Speed 2<Speed 3<Speed 4.)

In S403, the system control unit 115 determines whether or not the focus lens is currently being stopped. The focus lens is stopped immediately after transiting from the minute-driving operation to the hill-climbing operation, or when the focus lens has reached an edge of the search range during the hill-climbing operation. In S405, the system control unit 115 determines whether or not the current position of the focus lens is on an edge of the search range. When the system control unit 115 determines that the current position of the focus lens is on an edge of the search range, it sets a direction toward the other edge of the search range as the moving direction, and starts moving the focus lens accordingly in S407.

On the other hand, when the current position of the focus lens is not on an edge of the search range in S405, it is immediately after transiting from the minute-driving operation to the hill-climbing operation, and therefore the system control unit 115 starts moving the focus lens in the same moving direction as the direction of movement in the minute-driving operation in S406.

In S408, the system control unit 115 determines whether or not the number of times the position of the focus lens reached an edge has hit a predetermined number of times. When the focus position cannot be identified even though the focus lens reached at least both edges of the search range, it is considered that there is little change in the AF evaluation values across the entire search range, as in an area C shown in FIG. 12A. In this case, it is considered that the focus position is outside the search range of the focus lens, and if the hill-climbing operation is continued, then a large focus change is repeated. To avoid this situation, when the number of times the position of the focus lens reached an edge has hit the predetermined number of times, the system control unit 115 stops the focus lens in S409. Then, the system control unit 115 determines that the result of determination in the hill-climbing operation shows "defocused" and sets the AF evaluation value monitoring process as the next state to transit to in S410.

On the other hand, when the number of times the position of the focus lens reached an edge has not hit the predetermined number of times in S408, the system control unit 115 compares the current AF evaluation value with the immediately previous AF evaluation value, and determines whether or not the current AF evaluation value is larger than the immediately previous AF evaluation value in S411. When the current AF evaluation value is larger than the immediately previous AF evaluation value, the system control unit 115 determines that the result of determination in the hill-climbing operation shows "continue" and executes the hill-climbing operation continuously in S412. That is to say, when the increasing tendency of the AF evaluation values can be detected, e.g. when the hill-climbing operation is executed correctly in the actual direction of the focus position in an area B shown in FIG. 12A, the hill-climbing operation is continuously executed toward that direction.

On the other hand, when the current AF evaluation value is smaller than or equal to the immediately previous AF evaluation value, the system control unit 115 determines whether or not the current AF evaluation value has decreased after hitting the peak in S413. Specifically, the current AF evaluation value is smaller than or equal to the immediately previous AF evaluation value when, for example, the hill-climbing operation is executed from the area A to the area B shown in FIG. 12A. In this case, the system control unit 115 stops the focus lens in S414. Then, in S415, the system control unit 115 determines that the result of determination in the hill-climbing operation shows "focused," and sets the minute-driving operation as the next state to transit to. In S416, the system control unit 115 moves the focus lens to the position corresponding to the peak of the AF evaluation values.

On the other hand, in S413, the system control unit 115 does not determine that the current AF evaluation value has decreased after hitting the peak specifically when the hill-climbing operation is executed in a direction opposite to the direction of the focus position in the area B shown in FIG. 12A. Accordingly, in S417, the system control unit 115 reverses the moving direction of the focus lens. In S418, the system control unit 115 determines that the result of determination in the hill-climbing operation shows "continue," and executes the process of the hill-climbing operation continuously.

As described above, in the processes of S408 to S418, a change in the AF evaluation values that are obtained on a periodic basis is detected, and based on the detected change, a determination is made as to whether to continue the hill-climbing operation or transit to a state for executing another process. Based on the result of this determination, the system control unit 115 executes the focus detection method determination process in S419.

This concludes the description of the hill-climbing operation of the digital camera 1 according to an embodiment.

<AF Evaluation Value Monitoring Process>

The following describes the AF evaluation value monitoring process executed in S211 with reference to a flowchart of FIG. 5.

The AF evaluation value monitoring process is a process for detecting whether or not the current AF evaluation value has changed from a prestored AF evaluation value.

First, in S500, the system control unit 115 obtains an AF evaluation value from the AF processing unit 105. Next, in S501, the system control unit 115 compares the AF evaluation value stored in S210 of FIG. 2B with the latest AF evaluation value, and determines whether or not a change between the AF evaluation values is larger than or equal to a predetermined threshold. When the change between the AF evaluation values is larger than or equal to the predetermined threshold, the system control unit 115 determines that the change is large, and sets the minute-driving operation as the next state to transit to in S502.

On the other hand, when the change between the AF evaluation values is smaller than the predetermined threshold in S501, the system control unit 115 sets the AF evaluation value monitoring process as the next state to transit to so as to continue the AF evaluation value monitoring process in S503. Next, in S504, the system control unit 115 executes the focus detection method determination process based on the next state to transit to that has been determined by then. Specifics of the focus detection method determination process will be described later.

In the above manner, as shown in S210 to S213 of FIG. 2B, the AF evaluation value monitoring process is continuously executed on a periodic basis when the change between the AF evaluation values is small, that is to say, when the AF evaluation values are stable.

This concludes the description of the AF evaluation value monitoring process of the digital camera 1 according to an embodiment.

<Stability Monitoring Process>

Figure 6:
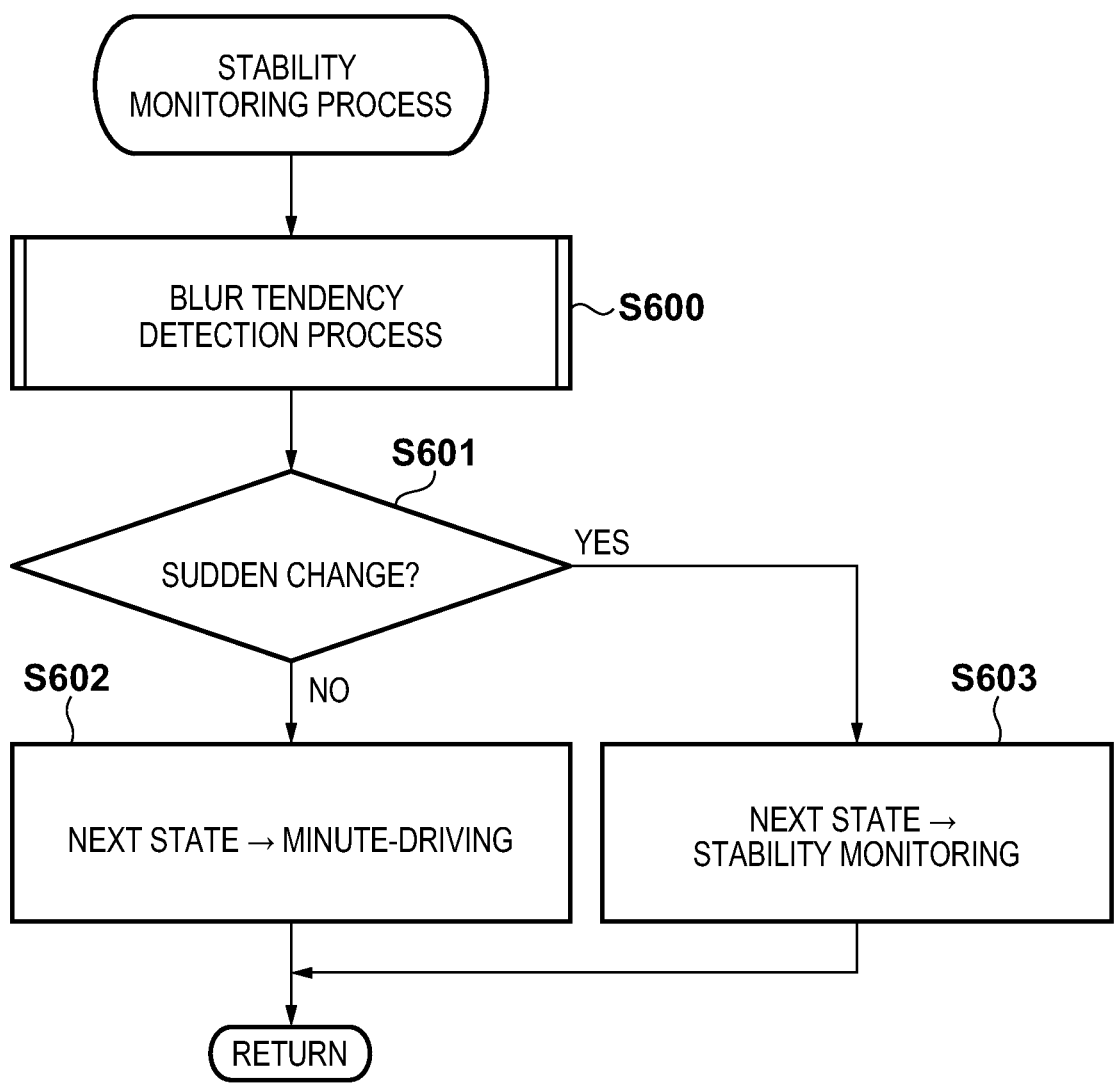
FIG. 6 is a flowchart of a stability monitoring process of a digital camera according to an embodiment.
Figure 8A:
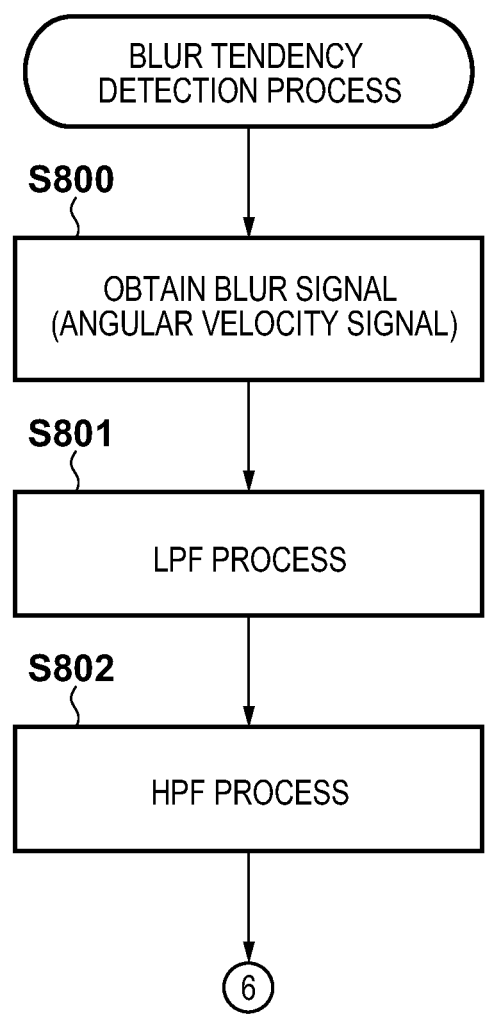
FIGS. 8A and 8B are flowcharts of a blur tendency detection process of a digital camera according to an embodiment.
Figure 8B:
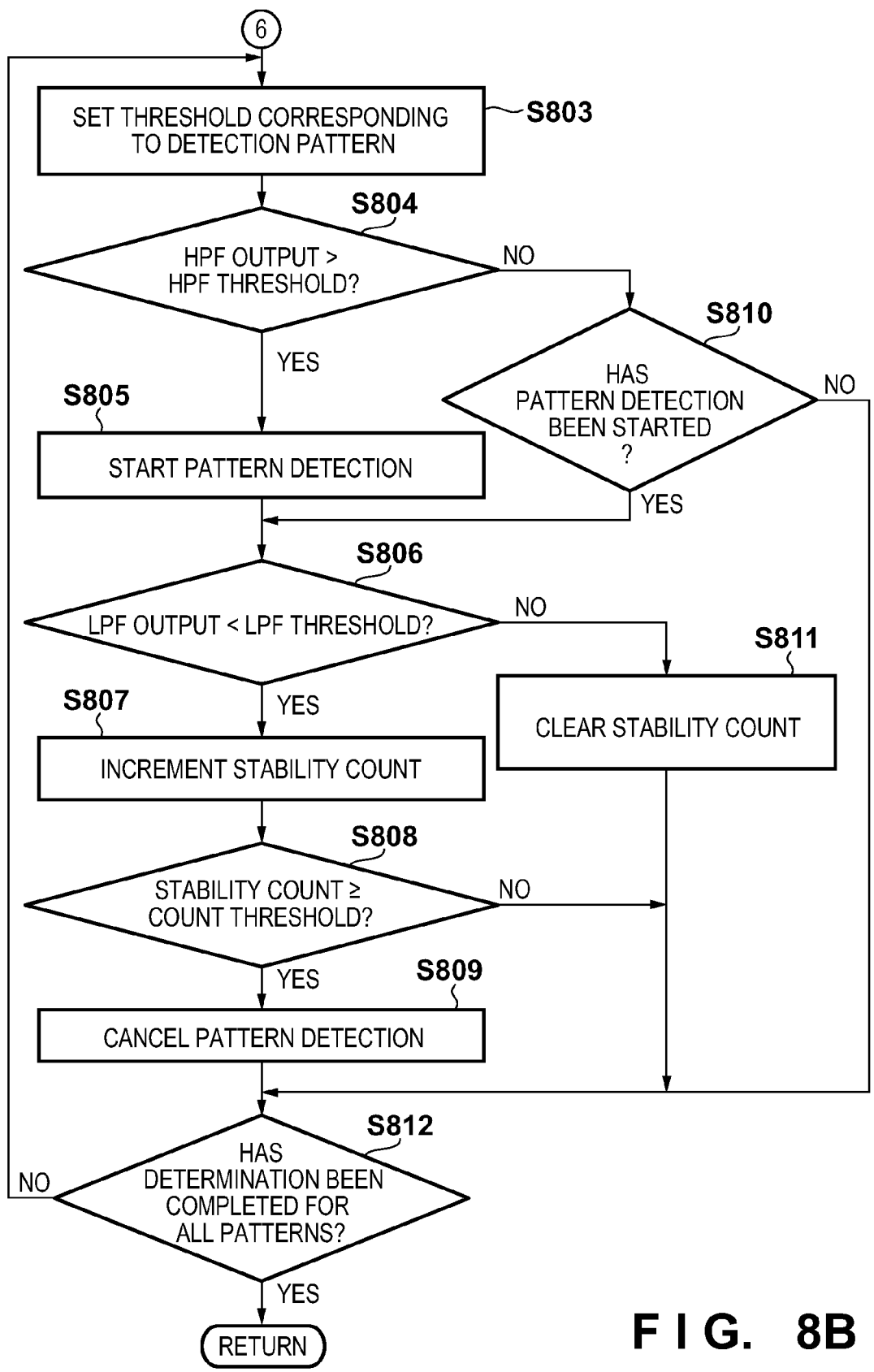

The following describes the stability monitoring process executed in S200 with reference to a flowchart of FIG. 6.

The stability monitoring process is a state for checking the changing tendency of a blur state and monitoring until the stable state of the digital camera 1 is determined.

First, in S600, the system control unit 115 executes a blur tendency detection process. The blur tendency detection process is a process for monitoring a temporal change in blur amounts that are obtained from the blur detection unit 121 on a periodic basis and determining the state of the digital camera 1. Specifics of the blur tendency detection process will be described later. Next, in S601, the system control unit 115 determines whether or not the digital camera 1 is in an unstable state (there is a sudden change in the blur amounts) based on the result of determination in the blur tendency detection process. When the system control unit 115 determines that the digital camera 1 is in the unstable state in S601, it sets the stability monitoring process as the next state to transit to in S603 and ends the process.

On the other hand, when the system control unit 115 determines that the digital camera 1 is in a stable state (there is no sudden change in the blur amounts) in S601, it sets the minute-driving operation as the next state to transit to in S602 and ends the process.

In the above manner, as shown in S200 and S201 of FIG. 2A, when the digital camera 1 is determined to be in an unstable state with a sudden change in the blur amounts, the system control unit 115 continuously executes the stability monitoring process on a periodic basis. This is because, when there is a sudden change in the blur amounts, an appropriate focus detection result may not be obtained due to a change in the AF evaluation values caused by the image blur.

This concludes the description of the stability monitoring process of the digital camera 1 according to an embodiment.

<Blur Tendency Detection Process>

The following describes the blur tendency detection process executed in S600 of FIG. 6 and S700 of FIG. 7 (described later) with reference to a flowcharts of FIGS. 8A and 8B, and FIGS. 9A and 9B.

The blur tendency detection process is a process for monitoring a temporal change in blur amounts that are obtained from the blur detection unit 121 on a periodic basis and determining the state of the digital camera 1. While it is normally possible to determine the absolute amount indicating whether the extent of blur is large or small from a blur amount obtained at a certain point in time, the characteristics of blur vary depending on the image capture method and image capture conditions, e.g. moderate blur, sudden blur, and periodic blur. It is preferable to realize a more stable focus detection operation by detecting these characteristics in more detail and giving feedback on the focus detection operation depending on the situation.

In view of this, two blur tendencies, namely a moderate change and a sudden change, are detected in the present embodiment. Note that a moderate change is one example of a changing tendency of blur corresponding to a state of change where focus detection can be performed, and a sudden change is one example of a changing tendency of blur corresponding to a state of change where focus detection cannot be performed. When a sudden change is detected, neither the minute-driving operation nor the hill-climbing operation is appropriate, and therefore the focus detection operation is stopped. On the other hand, in the case of a moderate change, focus detection is performed through the minute-driving operation that is more tolerant to image blur than the hill-climbing operation.

First, in S800, the system control unit 115 obtains a blur signal (angular velocity signal) from the blur detection unit 121. Next, in S801, the system control unit 115 applies an LPF process to the obtained blur signal. As there is a possibility that the blur signal obtained from the blur detection unit 121 is influenced by noise and the like, the blur signal is smoothed by the LPF process, which is a first filtering process, so as to make it easy to extract the changing tendency of the blur signal.

Thereafter, in S802, the system control unit 115 applies an HPF process, which is a second filtering process, to the blur signal to which the LPF process has been applied. Note that in the present embodiment, an absolute value is used as the HPF output. In this way, the first derivative output (i.e., inclination) of the blur amount can be computed. That is to say, a smooth change in the blur amount can be extracted in S801, and the changing tendency of blur, such as a moderate change and a sudden change, can be extracted in S802. Based on the detected changing tendency of blur (detection pattern), the system control unit 115 sets a threshold in S803. The following processes are executed while switching among thresholds (the later-described HPF threshold, LPF threshold and count threshold) at the time of determining a shape in accordance with a plurality of detection patterns that are detected based on the same detection rule.

First, in S804, the system control unit 115 compares the HPF output computed in S802 with the HPF threshold, and determines whether or not the HPF output is larger than the HPF threshold. As the HPF output indicates the time derivative (inclination) of the blur amount as mentioned earlier, the value thereof changes to a larger extent for a more sudden blur, and to a smaller extent for a more moderate blur. Based on these characteristics, the blur tendency is identified by comparing the HPF output with a preset threshold.

When the HPF output is larger than the threshold, the system control unit 115 starts pattern detection in S805. On the other hand, when the HPF output is smaller than or equal to the HPF threshold in S804, the system control unit 115 determines whether or not the pattern detection has been started in S810. The system control unit 115 proceeds to the process of S806 when the pattern detection has been started, and to the process of S812 when the pattern detection has not been started. In S812, the system control unit 115 determines whether or not determination has been completed for all patterns. When there is a pattern for which determination has not been made, the system control unit 115 returns to the process of S803, changes a condition regarding a threshold, and continues the pattern determination again. When determination has been completed for all patterns, the system control unit 115 ends the blur tendency detection process.

In S806, the system control unit 115 determines whether or not the LPF output is smaller than the LPF threshold. When the LPF output is smaller than the LPF threshold, the system control unit 115 sets the LPF threshold so that it can determine that the blur has become stable. When the LPF output is smaller than the LPF threshold, the system control unit 115 increments a stability count corresponding to the current detection pattern out of stability counts that are prepared in units of detection patterns in S807, and proceeds to the process of S808. That is to say, the value of the stability count indicates a time period in which a change in blur is small and therefore the stable state has continued.

When the LPF output is larger than or equal to the LPF threshold in S806, the system control unit 115 clears the stability count corresponding to the current detection pattern in S811 and proceeds to the process of S812.

In S808, the system control unit 115 determines whether or not the value of the stability count corresponding to the detection pattern is larger than or equal to the count threshold. Here, the system control unit 115 determines whether or not the following state has continued: the LPF output remains to be smaller than the LPF threshold a predetermined number of times in a row (i.e., for a certain time period). When the value of the stability count corresponding to the detection pattern is larger than or equal to the count threshold, the system control unit 115 cancels the pattern detection in S809. When the value of the stability count corresponding to the detection pattern is smaller than the count threshold, the system control unit 115 proceeds to the process of S812.

In the above manner, the pattern detection is started when the HPF output exceeds the threshold, and ended when the LPF output falls below the threshold a certain number of times in a row. A time period between the start and end of the pattern detection is recognized as a state exhibiting a predetermined changing tendency of blur. Furthermore, as a result of returning from S812 to S803 and performing the determination by changing one or more of the HPF threshold, LPF threshold and count threshold, changing tendencies of a plurality of types of blur can be detected. When the HPF output does not exceed any threshold, it is considered to be in a stable state with a small change in blur.

Figure 9A:
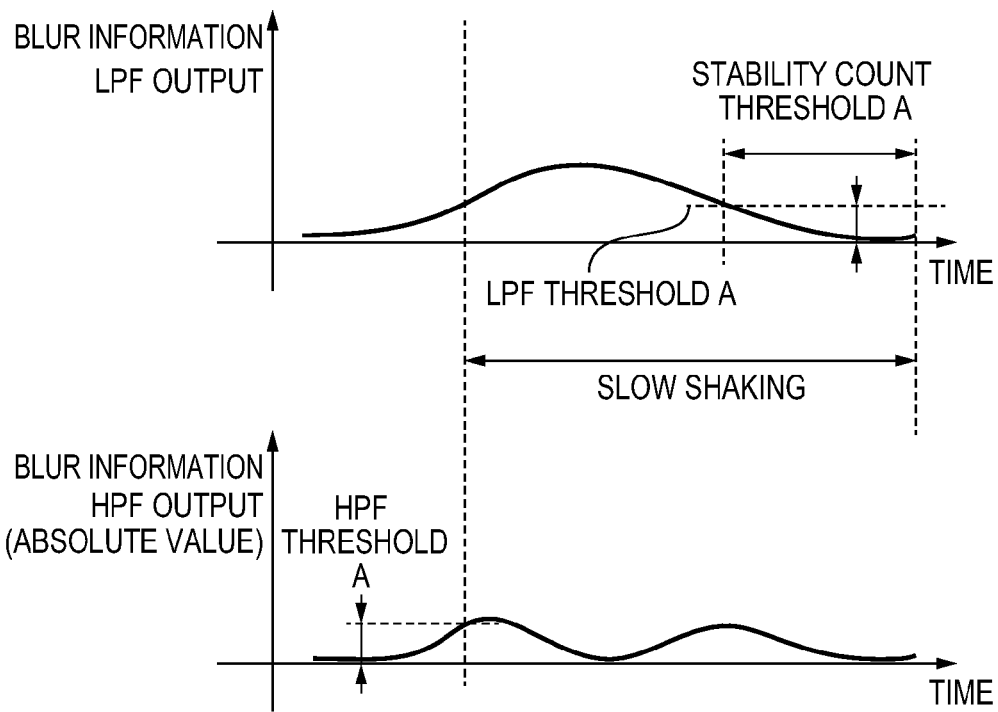
FIGS. 9A and 9B schematically show examples of a changing tendency of blur information.
Figure 9B:
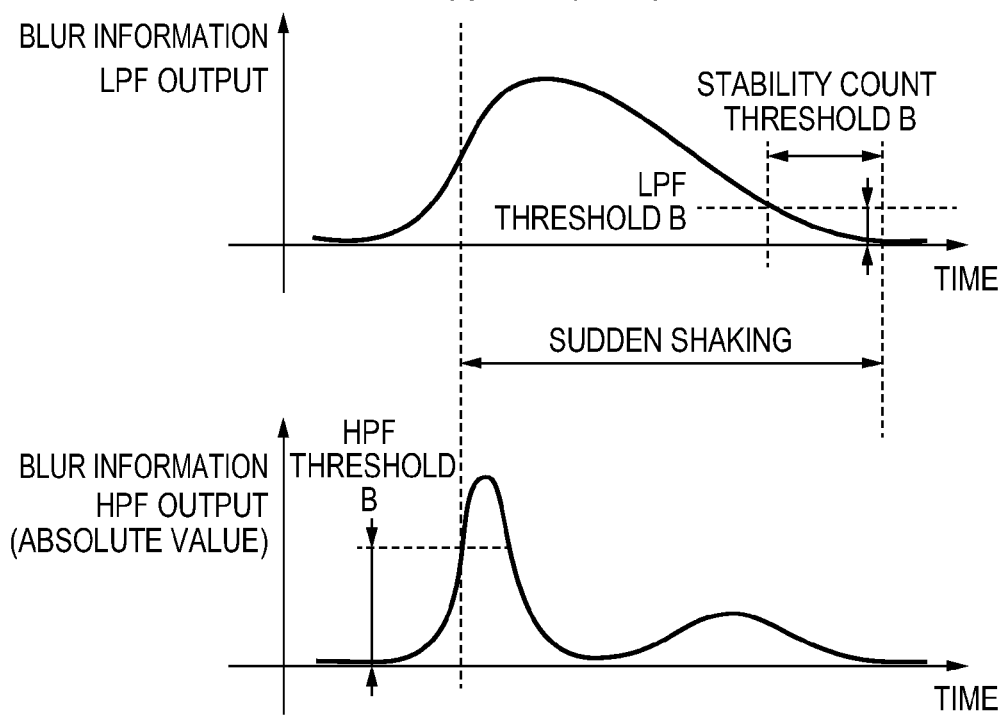

FIGS. 9A and 9B show examples of changing tendencies of blur that can be detected through the blur tendency detection process. FIG. 9A shows examples of the LPF output and HPF output for the case where blur has moderately changed, while FIG. 9B shows examples of the LPF output and HPF output for the case where blur has suddenly changed. As shown in FIGS. 9A and 9B, the LPF output and HPF output vary significantly depending on the changing tendency of blur. Therefore, the appropriate HPF threshold, LPF threshold and stability count threshold corresponding to the detected changing tendency of blur (i.e., detection pattern) are set as shown in, for example, FIGS. 9A and 9B. In this way, two patterns of changing tendencies of blur, namely a moderate change and a sudden change, are detected.

While the above has described detection of two changing tendencies of blur shown in FIGS. 9A and 9B, the number of detection patterns may be further increased by preparing other sets of thresholds corresponding to detection patterns.

Furthermore, by adding change detection methods per se, other changing tendencies can be extracted. This makes it possible to detect, for example, whether or not signals of a predetermined level have increased or decreased on a periodic basis within a certain time period, such as the influence of periodic blur.

Also, when an image capture signal obtained from the image capture processing unit 109 is influenced by a camera shake, panning, and the like, the movement amount of the subject in an image indicated by the image capture signal is proportional to the focal length of the image capture lens (inversely proportional to the angle of view). Therefore, the zoom lens control unit 101 may compute the focal length corresponding to the current position of the zoom lens (angle of view) so that various types of thresholds (the HPF threshold, LPF threshold, stability count, and the like) for the blur tendency detection process can be set in units of focal lengths in the blur tendency detection process.

This concludes the description of the blur tendency detection process of the digital camera 1 according to an embodiment.

<Focus Detection Method Determination Process>

The following describes the focus detection method determination process executed in S317 of FIG. 3B, S419 of FIG. 4B and S504 of FIG. 5 with reference to a flowchart of FIG. 7.

The focus detection method determination process is a process for switching among focus detection methods used in the focus detection operation at appropriate timing in accordance with the detected changing tendency of blur.

First, in S700, the system control unit 115 executes the blur tendency detection process that has been described above with reference to FIGS. 8A, 8B, 9A and 9B. Next, in S701, the system control unit 115 determines the changing tendency of blur detected in S700. When the system control unit 115 determines the occurrence of a sudden change, it sets the stability monitoring process as the next state to transit to in S704. When this setting is made in the minute-driving operation (S371) or the hill-climbing operation (S419), the focus detection operation is stopped. On the other hand, when the system control unit 115 determines that the changing tendency of blur does not show a sudden change, it determines whether or not the changing tendency of blur shows a moderate change in S702. When the system control unit 115 does not determine that the changing tendency of blur shows a moderate change, it is considered to be in a stable state with a small blur amount and a small change in the blur amount, and therefore the process is ended. When the system control unit 115 determines that the changing tendency of blur shows a moderate change, it proceeds to the process of S703.

In S703, the system control unit 115 determines whether or not the next state to transit to is the hill-climbing operation. When the next state to transit to is the hill-climbing operation, the system control unit 115 re-sets the minute-driving operation as the next state to transit to in S705. At the time of execution of S703, the next state to transit to has already been determined through the minute-driving operation and the hill-climbing operation that have been described with reference to FIGS. 3A to 4B, respectively. Therefore, in S703, it suffices for the system control unit 115 to determine whether or not the next state to transit to, which has been determined immediately therebefore, is the hill-climbing operation.

On the other hand, when the next state to transit to is not the hill-climbing operation in S703, the system control unit 115 ends the process. Therefore, when it is determined that a change in blur is not moderate (when it is determined to be in a stable state), and when it is determined that a change in blur is moderate and the next state to transit to is not the hill-climbing operation, the setting of the next state to transit to remains the same as previously determined. As described above, in the present embodiment, the next state to transit to is changed from the state determined in the minute-driving operation and hill-climbing operation in accordance with the changing tendency of blur.

This is because whether or not the result of determination is easily influenced by blur varies between the minute-driving operation and hill-climbing operation. That is to say, in the case of the minute-driving operation that identifies the focus position from a change in the AF evaluation values obtained through intermittent lens movement, there is a possibility that the focus position can be tracked even under some influence of blur, with the only drawback being deceleration of the tracking speed. On the other hand, in the case of the hill-climbing operation that identifies the focus position from a change in a sequence of AF evaluation values obtained through continuous lens movement, there is a high possibility that the focus position is erroneously determined because the influence of blur is directly reflected in the result of determination as a change in the AF evaluation values. In the focus detection method determination process, an appropriate focus detection method is selected in consideration of both various characteristics of different focus detection methods and the changing tendency of blur.

This concludes the description of the focus detection method determination process of the digital camera 1 according to an embodiment.

As described above, in this embodiment, changing tendencies of a plurality of blurs are identified through the blur tendency detection process, and focus detection methods appropriate for the identified changing tendencies of blurs can be selected and executed through the focus detection method determination process. In this way, stable focus tracking can be realized even in a scene where blur Occurs.

Second Embodiment

A description is now given of the second embodiment. In the second embodiment, configurations similar to the configurations of the first embodiment can be used, with the exception that a different determination method is used in the blur tendency detection process. Therefore, only the blur tendency detection process is described below, and the description that has already been given above is omitted.

<Blur Tendency Detection Process>

Figure 10:
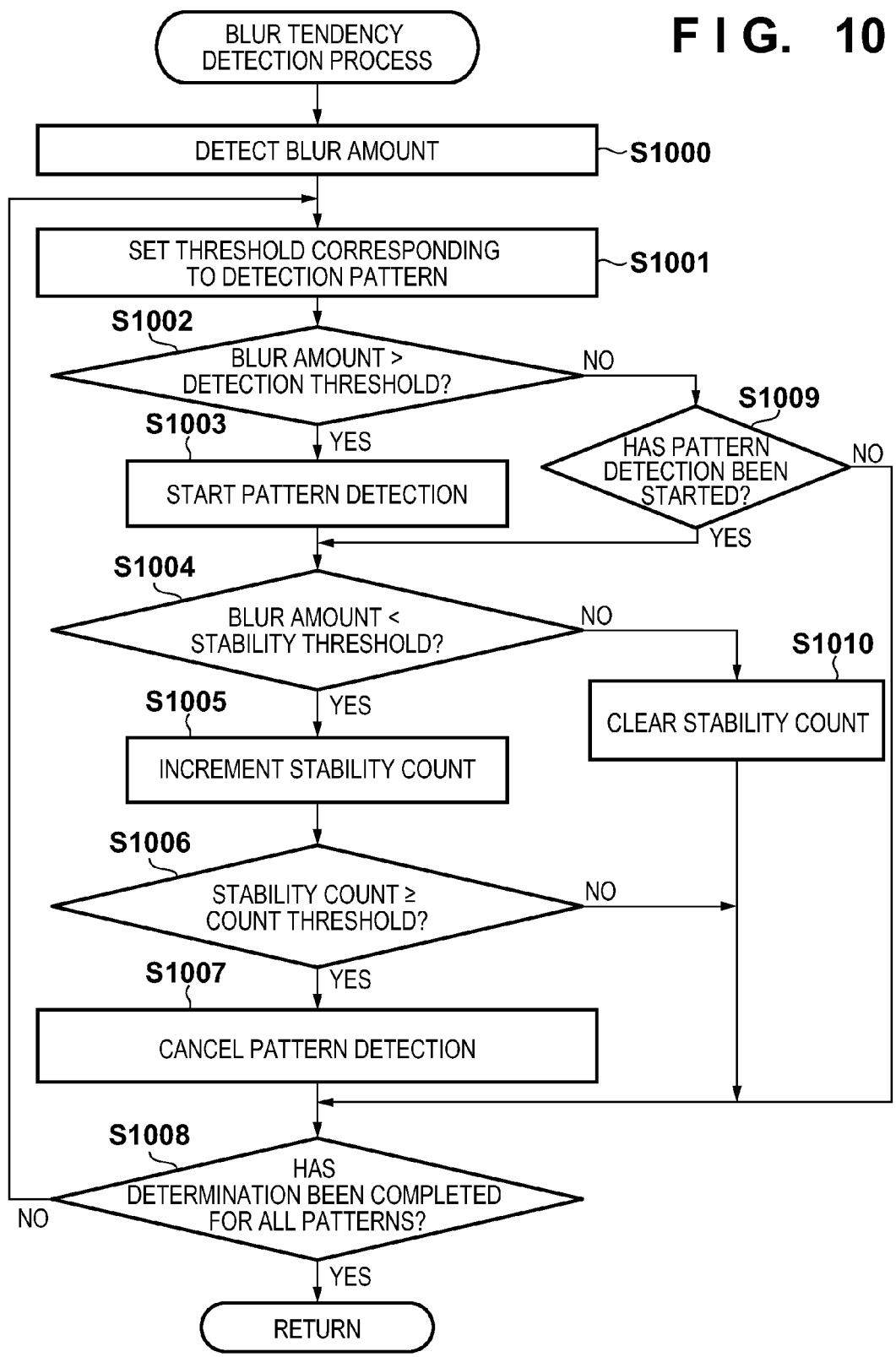
FIG. 10 is a flowchart of a blur tendency detection process of a digital camera according to the second embodiment.

The following describes the blur tendency detection process according to the present embodiment with reference to a flowchart of FIG. 10. In the first embodiment, the changing tendency of blur is detected based on the output obtained by applying the LPF process and HPF process to the blur amount obtained from the blur detection unit 121. On the other hand, in the present embodiment, the changing tendency of a blur amount is detected using the blur amount as-is (without application of filtering processes).

First, in S1000, the system control unit 115 detects a blur amount by obtaining a blur signal from the blur detection unit 121 (the output from the angular velocity sensor). Then, the system control unit 115 sets a threshold corresponding to the detected changing tendency of blur (detection pattern) in S1001. The following processes are executed while switching among thresholds (the later-described detection threshold, stability threshold and count threshold) at the time of determining a shape in accordance with a plurality of patterns that are detected based on the same detection rule.

First, in S1002, the system control unit 115 compares the blur signal detected in S1000 with the detection threshold, and determines whether or not the blur signal is larger than the detection threshold. When the blur amount is larger than the detection threshold, the system control unit 115 starts pattern detection in S1003. On the other hand, when the blur signal is smaller than or equal to the detection threshold, the system control unit 115 determines whether or not the pattern detection has been started in S1009. The system control unit 115 proceeds to the process of S1004 when the pattern detection has been started, and to the process of S1008 when the pattern detection has not been started.

In S1008, the system control unit 115 determines whether or not determination has been completed for all patterns. When there is a pattern for which determination has not been completed, the system control unit 115 returns to the process of S1001, changes a condition regarding a threshold, and continues the pattern determination again. When determination has been completed for all patterns, the system control unit 115 ends the blur tendency detection process.

In S1004, the system control unit 115 determines whether or not the blur amount is smaller than the stability threshold. As with the LPF threshold according to the first embodiment, the stability threshold is a threshold used to determine whether or not the blur amount has decreased and the blur has become stable. When the blur amount is smaller than the stability threshold, the system control unit 115 increments a stability count corresponding to the current detection pattern out of stability counts that are prepared in units of detection patterns in S1005, and proceeds to the process of S1006. When the blur amount is larger than or equal to the stability threshold, the system control unit 115 clears the stability count corresponding to the current detection pattern in S1010, and proceeds to the process of S1008.

In S1006, the system control unit 115 determines whether or not the value of the stability count corresponding to the detection pattern is larger than or equal to the count threshold. Here, the system control unit 115 determines whether or not the following state has continued: the blur amount remains smaller than the stability threshold a predetermined number of times in a row (i.e., for a certain time period). When the value of the stability count corresponding to the detection pattern is larger than or equal to the count threshold, the system control unit 115 cancels the pattern detection in S1007. On the other hand, when the value of the stability count corresponding to the detection pattern is smaller than the count threshold, the system control unit 115 proceeds to the process of S1008.

In the above manner, the pattern detection is started when the blur amount exceeds the threshold, and ended when the blur amount falls below the stability threshold a certain number of times in a row. A time period between the start and end of the pattern detection is recognized as a state exhibiting a predetermined changing tendency of blur. Furthermore, as a result of returning from S1008 to S1001 and performing the determination by changing one or more of the detection threshold, stability threshold and count threshold, changing tendencies of a plurality of types of blur can be detected. When the blur amount does not exceed any detection threshold, it is considered to be in a stable state with a small blur amount.

This concludes the description of the blur tendency detection process of the digital camera 1 according to the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-180205, filed on Aug. 15, 2012, which is hereby incorporated by reference herein its entirety.

What is claimed is:

1. An image capture apparatus comprising:
an image sensor;
a computation unit that computes a focus evaluation value indicating contrast of a subject image included in a focus detection area using an image signal output from the image sensor;
a first focus adjustment unit that performs focus adjustment through a reciprocating motion of a focus lens;
a second focus adjustment unit that performs focus adjustment by moving the focus lens in a direction toward which the focus evaluation value increase,
a blur detection unit that detects a blur amount of the subject image; and
a control unit that performs an operation for identifying a direction of a focus position using the first focus adjustment unit and then performs an operation for identifying the focus position,
wherein in a case that the blur amount is larger than or equal to a first threshold, the control unit performs the operation for identifying the focus position using the first focus adjustment unit without using the second focus adjustment unit, and
wherein when the blur amount is smaller than the first threshold, the control unit performs the operation for identifying the focus position using the first focus detection unit and the second focus detection unit.

2. The image capture apparatus according to claim 1,
wherein when the blur amount is larger than or equal to a second threshold that is larger than the first threshold, the control unit does not perform the operation for identifying the focus position.

3. The image capture apparatus according to claim 1,
wherein the blur detection unit includes a high-pass filter and a low-pass filter, and
when an output from the high-pass filter is larger than or equal to a third threshold, the control unit performs the gyration for identifying the focus position using the first focus adjustment unit without using the second focus adjustment unit, and when an output from the low-pass filter is smaller than a fourth threshold, the control unit performs the operation for identifying the focus position using the first focus detection unit and the second focus detection unit.

4. The image capture apparatus according to claim 1,
wherein the operation for identifying a direction of a focus position and the operation for identifying the focus position are performed during capturing moving images.

5. A control method for an image capture apparatus including an image sensor, the method comprising:
a computation step of computing a focus evaluation value indicating contrast of a subject image included in a focus detection area using an image signal output from the image sensor;
a blur detection step of detecting a blur amount of the subject image; and
a focus adjustment step of performing focus adjustment by driving a focus lens,
wherein the focus adjustment step can execute:
a first focus adjustment method for performing focus adjustment through a reciprocating motion of the focus lens; and
a second focus adjustment method for performing focus adjustment by moving the focus lens in a direction toward which the focus evaluation value increases; and
a control step of performing an operation for identifying a direction of a focus position by controlling the focus adjustment step to execute the first focus adjustment method and then performs an operation for identifying the focus position,
wherein in a case that the blur amount is larger than or equal to a first threshold, the control step performs the operation for identifying the focus position by controlling the focus adjustment step to execute the first focus adjustment method without executing the second focus adjustment method, and
wherein when the blur amount is smaller than the first threshold, the control step performs the operation for identifying the focus position using the first focus adjustment method and the second focus adjustment method.

6. A non-transitory computer-readable storage medium having stored therein a program for causing a computer of an image capture apparatus to execute the steps according to claim 5.

7. An image capture apparatus comprising:
an image sensor;
a computation unit that computes a focus evaluation value indicating contrast of a subject image included in a focus detection area using an image signal output from the image sensor;
a first focus adjustment unit that performs focus adjustment using a wobbling operation that reciprocates a position of a focus lens;
a second focus adjustment unit that performs focus adjustment using a hill-climb operation that moves the focus lens in a direction toward which the focus evaluation value increases;
a blur detection unit that detects a blur amount of the subject image; and
a control unit that performs an operation for identifying a direction of a focus position using the first focus adjustment unit and then performs an operation for identifying the focus position,
wherein in a case that the blur amount is larger than or equal to a first threshold, the control unit performs the operation for identifying the focus position using the first focus adjustment unit without using the second focus adjustment unit, and
wherein when the blur amount is smaller than the first threshold, the control unit performs the operation for identifying the focus position using the first focus detection unit and the second focus detection unit.

8. The image capture apparatus according to claim 7,
wherein the operation for identifying a direction of a focus position and the operation for identifying the focus position are performed during capturing moving images.

9. A control method for an image capture apparatus including an image sensor, the method comprising:
a computation step of computing a focus evaluation value indicating contrast of a subject image included in a focus detection area using an image signal output from the image sensor;
a blur detection step of detecting a blur amount of the subject image; and
a focus adjustment step of performing focus adjustment by driving a focus lens,
wherein the focus adjustment step can execute:
a first focus adjustment method for performing focus adjustment using a wobbling operation that reciprocates a position of the focus lens;
a second focus adjustment method for performing focus adjustment using a hill-climb operation that moves the focus lens in a direction toward which the focus evaluation value increases; and
a control step of performing an operation for identifying a direction of a focus position by controlling the focus adjustment step to execute the first focus adjustment method and then performs an operation for identifying the focus position,
wherein in a case that the blur amount is larger than or equal to a first threshold, the control step performs the operation for identifying the focus position by controlling the focus adjustment step to execute the first focus detection method without executing the second focus detection method, and
wherein when the blur amount is smaller than the first threshold, the control step performs the operation for identifying the focus position using the first focus adjustment method and the second focus adjustment method.

10. An image capture apparatus comprising:
an image sensor;
a computation unit that computes a focus evaluation value indicating contrast of a subject image included in a focus detection area using an image signal output from the image sensor;
a first focus detection unit that performs focus detection through a reciprocating motion of a focus lens;
a second focus detection unit that performs focus detection by moving the focus lens in a direction toward which the focus evaluation value increases; and
a blur detection unit that detects a blur amount of the subject image, wherein when the blur amount is larger than or equal to a first threshold, focus detection is performed using the first focus detection unit without using the second focus detection unit, and wherein when the blur amount is larger than or equal to a second threshold that is larger than the first threshold, focus detection is not performed.

11. The image capture apparatus according to claim 10, wherein the operation for identifying a direction of a focus position and the operation for identifying the focus position are performed during capturing moving images.

12. An image capture apparatus comprising:

an image sensor;

a computation unit that computes a focus evaluation value indicating contrast of a subject image included in a focus detection area using an image signal output from the image sensor;

a first focus detection unit that performs focus detection through a reciprocating motion of a focus lens;

a second focus detection unit that performs focus detection by moving the focus lens in a direction toward which the focus evaluation value increases; and a blur detection unit that detects a blur amount of the subject image, wherein when the blur amount is larger than or equal to a first threshold, focus detection is performed using the first focus detection unit without using the second focus detection unit, wherein the blur detection unit includes a high-pass filter and a low-pass filter, and when an output from the high-pass filter is larger than or equal to a third threshold, focus detection is performed using the first focus detection unit without using the second focus detection unit, and when an output from the low-pass filter is smaller than a fourth threshold, focus detection is performed using the first focus detection unit and the second focus detection unit.

13. The image capture apparatus according to claim 12, wherein the operation for identifying a direction of a focus position and the operation for identifying the focus position are performed during capturing moving images.

14. An image capture apparatus comprising:

an image sensor;

a computation unit that computes a focus evaluation value indicating contrast of a subject image included in a focus detection area using an image signal output from the image sensor;

a first focus adjustment unit that performs focus adjustment using a wobbling operation;

a second focus adjustment unit that performs focus adjustment using a hill-climb operation;

a blur detection unit that detects a blur amount of the subject image; and a control unit that performs an operation for identifying a direction of a focus position using the first focus adjustment unit and then performs an operation for identifying the focus position, wherein in a case that the blur amount is larger than or equal to a first threshold, the control unit performs the operation for identifying the focus position using the first focus adjustment unit without using the second focus adjustment unit, and wherein when the blur amount is smaller than the first threshold, the control unit performs the operation for identifying the focus position using the first focus detection unit and the second focus detection unit.

15. The image capture apparatus according to claim 14, wherein the operation for identifying a direction of a focus position and the operation for identifying the focus position are performed during capturing moving images.

16. A control method for an image capture apparatus including an image sensor, the method comprising:

a computation step of computing a focus evaluation value indicating contrast of a subject image included in a focus detection area using an image signal output from the image sensor;

a blur detection step of detecting a blur amount of the subject image; and a focus adjustment step of performing focus adjustment by driving a focus lens, wherein the focus adjustment step can execute:

a first focus adjustment method for performing focus adjustment using a wobbling operation;

a second focus adjustment method for performing focus adjustment using a hill-climb operation; and a control step of performing an operation for identifying a direction of a focus position by controlling the focus adjustment step to execute the first focus adjustment method and then performs an operation for identifying the focus position, wherein in a case that the blur amount is larger than or equal to a first threshold, the control step performs the operation for identifying the focus position by controlling the focus adjustment step to execute the first focus detection method without executing the second focus detection method, and wherein when the blur amount is smaller than the first threshold, the control step performs the operation for identifying the focus position using the first focus adjustment method and the second focus adjustment method.

* * * * *